United States Patent
Ng et al.

(10) Patent No.: US 11,581,951 B1
(45) Date of Patent: Feb. 14, 2023

(54) APPARATUSES AND METHODS OF FAR-END TRANSMITTER SKEW MONITORING IN DIGITAL SUBCARRIER MULTIPLEXING SYSTEMS

(71) Applicants: Wing Chau Ng, Stittsville (CA); Xuefeng Tang, Kanata (CA); Chuandong Li, Ottawa (CA)

(72) Inventors: Wing Chau Ng, Stittsville (CA); Xuefeng Tang, Kanata (CA); Chuandong Li, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/589,284

(22) Filed: Jan. 31, 2022

(51) Int. Cl.
  *H04B 10/61* (2013.01)
  *H04J 14/02* (2006.01)
  *H04B 10/516* (2013.01)

(52) U.S. Cl.
  CPC ..... *H04B 10/6166* (2013.01); *H04B 10/5161* (2013.01); *H04B 10/6165* (2013.01); *H04J 14/0298* (2013.01)

(58) Field of Classification Search
  CPC ............ H04B 10/6166; H04B 10/5161; H04B 10/6165; H04J 14/0298
  USPC .......................................................... 398/34
  See application file for complete search history.

(56) References Cited

U.S. PATENT DOCUMENTS

| | | | |
|---|---|---|---|
| 7,684,712 B1 * | 3/2010 | Roberts ............ | H04B 10/6162 398/208 |
| 9,106,503 B1 * | 8/2015 | Zhang ................ | H04L 27/38 |
| 9,847,841 B1 * | 12/2017 | Kaneda ............. | H04B 10/6161 |
| 10,038,498 B1 * | 7/2018 | Fan ..................... | H04B 10/532 |
| 11,277,207 B1 * | 3/2022 | Ng .................... | H04B 10/40 |
| 2003/0185295 A1 * | 10/2003 | Yousef .............. | H04L 25/03057 375/233 |
| 2013/0243420 A1 * | 9/2013 | Li ..................... | H04B 10/6162 398/25 |

(Continued)

FOREIGN PATENT DOCUMENTS

| | | | | |
|---|---|---|---|---|
| EP | 3121976 A1 * | 1/2017 | ......... | H04B 10/6161 |
| EP | 3208952 A1 | 8/2017 | | |

OTHER PUBLICATIONS

Zhang et al; Soft-Decision-Driven Sparse Channel Estimation and Turbo Equalization for MIMO Underwater Acoustic Communications; IEEE Access; Feb. 2018; pp. 1-19. (Year: 2018).*

(Continued)

*Primary Examiner* — Amritbir K Sandhu

(57) ABSTRACT

Apparatuses and methods for far-end monitoring of transmitter IQ skew in a DSCM system are described. Soft symbols for a given subchannel and a corresponding mirror subchannel are used as joint inputs to a MIMO equalizer. The hard decision symbols for the given subchannel and mirror subchannel are used as references to compute the equalizer coefficients. An estimated phase or estimated transmitter IQ skew is computed for at least the given subchannel using the equalizer coefficients. The computation is repeated to obtain estimated phase or estimated transmitter skew for all subchannels. The transmitter IQ skew is computed using the estimates from all subchannels. The computation is performed for each polarization. The computed transmitter IQ skew is communicated back to the transmitter via optical path (for correcting the skew).

20 Claims, 13 Drawing Sheets

(56) References Cited

U.S. PATENT DOCUMENTS

| | | | |
|---|---|---|---|
| 2017/0244489 A1* | 8/2017 | Zhuge | H04B 10/588 |
| 2020/0204262 A1 | 6/2020 | Geyer et al. | |
| 2020/0266901 A1* | 8/2020 | Fan | H04L 25/03019 |

OTHER PUBLICATIONS

Zhang et al; Soft-Decision-Driven Sparse Channel Estimation and Turbo Equalization for MIMO Underwater Acoustic Communications; Feb. 2018; IEEE Access; pp. 1-19 (Year: 2018).*

H. Sun et al., "800G DSP ASIC Design Using Probabilistic Shaping and Digital Sub-Carrier Multiplexing," Journal of Lightwave Technology, vol. 38, No. 17 Sep. 2020.

W. Shieh and K.-P. Ho, "Equalization-enhanced phase noise for coherent detection systems using electronic digital signal processing," Opt. Express, vol. 16, No. 20 2018.

M. Qiu, "Digital subcarrier multiplexing for fiber nonlinearity mitigation in coherent optical communication systems," Optics express 22 (15) 2014.

E. Porto da Silva and D. Zibar, "Widely Linear Blind Adaptive Equalization for Transmitter IQ-Imbalance/Skew Compensation in Multicarrier Systems," ECOCO 2016.

P. Skvortcov et al., "Joint Tx and Rx skew calibration in coherent transceivers based on Rx-side DSP," Proc. IPC, Reston, USA Oct. 2018.

Y. Fan et al., "Calibration and monitoring of coherent optical transceiver imperfections," Proc. SPIE 2020.

W. C. Ng, et al., "Joint Transmitter and Receiver IQ Differential Phase Calibration using a single 4x8 MIMO Equalizer", Proc. APC 2021 (SPPCom), SpTh1D.4. 2021.

* cited by examiner

APPARATUSES AND METHODS OF FAR-END TRANSMITTER SKEW MONITORING IN DIGITAL SUBCARRIER MULTIPLEXING SYSTEMS

FIELD

The present disclosure is related to apparatuses and methods for far-end transmitter skew monitoring in a DSCM system.

BACKGROUND

Coherent optical transceivers (also called coherent transceivers) are used to transmit and receive optical signals by modulating the amplitude and phase of light transmitted through an optical channel, such as a fiber optic cable. A technique for coherent transmission involves using two separate electrical data channels—an in-phase (I) data channel and a quadrature (Q) data channel—to form the I and Q components of the optical signal.

At the transmitter, a laser source is used as a carrier for the optical signal. Electrical data on the I data channel and on the Q data channel are separately modulated on respective I and Q paths. Data on the Q path passes through a phase shifter of around 90 degree. The I and Q paths are subsequently combined to form an optical coherent signal (having both amplitude and phase information) at the output. For a dual-polarization optical signal, there is one IQ modulator for X-polarization, and another for Y-polarization, where X and Y denote the two orthogonal geometrical axes in optical fibers.

Time misalignment between the I and Q data channels of the IQ modulators at the transmitter and the receiver (also referred to as IQ skew) is an impairment that may degrade the performance of the coherent transceiver. IQ skew causes sampling error at the receiver, which can result in significant degradation in the signal-to-noise ratio (SNR). Although factory calibration can mitigate IQ skew at the transmitter, there can be skew drift when the equipment is in use (e.g., due to aging, rebooting, etc.). Accordingly, it is necessary to monitor transmitter skew after deployment.

There currently exist techniques for transmitter skew monitoring at receivers (referred to as far-end transmitter skew monitoring) when the signal is a single-carrier (SC) quadrature amplitude modulation (QAM) signal. However, for high transmission rates (e.g., above 800 Gb/s), digital subcarrier multiplexed (DSCM) signals are preferred. A DSCM signal consists of a group of frequency-multiplexed QAM signals carried by a group of subcarriers (or subchannels). A challenge with DSCM signals is that they are very sensitive to transmitter IQ skew. Existing techniques for transmitter skew monitoring that are designed for SC QAM systems are not suitable for DSCM systems.

Accordingly, it would be useful to provide apparatuses and methods for far-end transmitter skew monitoring, which can be used for DSCM systems.

SUMMARY

In various examples, the present disclosure describes apparatuses and methods for monitoring transmitter IQ skew at a far-end receiver. Examples disclosed herein may be implemented using digital signal processing (DSP) in software or a low-rate processor attached to the DSP of the receiver. Examples of the present disclosure may be implemented using existing hardware.

A technical advantage of the present disclosure is that far-end monitoring of transmitter IQ skew in a DSCM system is possible (whereas existing techniques for transmitter skew monitoring are designed for SC systems and are not suitable for DSCM systems).

Examples of the present disclosure make use of joint equalization of a pair of mirror subchannels, using soft symbols of the mirror subchannels as inputs to the MIMO equalizer and hard decision symbols as references for computing the equalizer coefficients. The transmitter IQ skew may then be estimated using the equalizer coefficients.

In an example aspect, the present disclosure describes an apparatus including a receiver configured to: receive four channels of a digital subcarrier multiplexed (DSCM) signal received from a transmitter, the four channels corresponding to in-phase (I) and quadrature (Q) channels for each of two orthogonal polarizations. The apparatus further includes a processor configured to: compute a transmitter IQ skew for each of the two polarizations by: computing equalizer coefficients for a given subchannel by: obtaining soft symbols and hard decision symbols for the given subchannel and a corresponding mirror subchannel; obtaining equalizer outputs from a multiple-input multiple-output (MIMO) equalizer, using the soft symbols of the given subchannel and the mirror subchannel as inputs to the MIMO equalizer; and computing equalizer coefficients, using the hard decision symbols of the given subchannel and the mirror subchannel as references, by minimizing error between the equalizer outputs and the references. The transmitter IQ skew for each of the two polarizations is further computed by: computing an estimated phase or an estimated transmitter IQ skew for at least the given subchannel using the equalizer coefficients computed for the given subchannel; repeating the computation of the estimated phase or the estimated transmitter IQ skew, to obtain estimates for all subchannels of the DSCM signal; and computing the transmitter IQ skew for each of the two polarizations using the estimates for all subchannels. The apparatus further communicates the computed transmitter IQ skew for the two polarizations to the transmitter.

In an example of the preceding example aspect of the apparatus, the MIMO equalizer may be a 4×4 real-valued multi-tap MIMO equalizer having sixteen multi-tap equalizer coefficients, and the transmitter IQ skew may be computed for each of the two polarizations by: computing the multi-tap equalizer coefficients for the given subchannel by: obtaining soft symbols and hard decision symbols for the given subchannel and the mirror subchannel; obtaining multi-tap equalizer outputs from the MIMO equalizer, using real and imaginary components the soft symbols of the given subchannel and real and imaginary components of the soft symbols of the mirror subchannel as inputs to the MIMO equalizer; and computing the multi-tap equalizer coefficients, using real and imaginary components of the hard decision symbols of the given subchannel and real and imaginary components of the hard decision symbols of the mirror subchannel as references. The transmitter IQ skew may be further computed by: computing the estimated transmitter IQ skew for the given subchannel and for the mirror subchannel using the multi-tap equalizer coefficients computed for the given subchannel; repeating the computation of the estimated transmitter IQ skew to obtain estimated transmitted IQ skews for all subchannels of the DSCM signal; and computing the transmitter IQ skew using the estimated transmitter IQ skew for all subchannels.

In an example of the preceding example aspect of the apparatus, computing the estimated transmitter IQ skew for the given subchannel and the mirror subchannel may include: converting the multi-tap equalizer coefficients from time domain to frequency domain; extracting phase response for the given subchannel and for the mirror subchannel using the converted equalizer coefficients; and estimating the transmitter IQ skew for the given subchannel using a slope of the phase response of the given subchannel, and estimating the transmitter IQ skew for the mirror subchannel using a slope of the phase response of the mirror subchannel.

In an example of the preceding example aspect of the apparatus, extracting phase response for the given subchannel and for the mirror subchannel using the converted equalizer coefficients may include: extracting the phase response for the given subchannel using a first equation: $\varphi_i(f)= \measuredangle C(f)$ where $\varphi_i(f)$ denotes the phase response for the given subchannel, $f$ denotes frequency and where $C(f)$ is an empirical construct defined by the converted equalizer coefficients such that the slope of $\varphi_i(f)$, when plotted against frequency, is used to estimate the transmitter IQ skew for the given subchannel according to:

$$\hat{\tau}_i = \frac{1}{2\pi} \frac{d}{df} \varphi_i(f)$$

where $\hat{\tau}_i$ denotes the estimated transmitter IQ skew for the given subchannel, and $$\frac{d}{df} \varphi_i(f)$$

denotes the slope of the phase response for the given subchannel plotted against frequency; and extracting the phase response for the mirror subchannel using a second equation: $\varphi_{N+1-i}(f)= \measuredangle D(f)$ where $\varphi_{N+1-i}(f)$ denotes the phase response for the mirror subchannel, $f$ denotes frequency and where $D(f)$ is an empirical construct defined by the converted equalizer coefficients such that the slope of $\varphi_{N+1-i}(f)$, when plotted against frequency, is used to estimate the transmitter IQ skew for the mirror subchannel according to:

$$\hat{\tau}_{N+1-i} = \frac{1}{2\pi} \frac{d}{df} \varphi_{N+1-i}(f)$$

where $\hat{\tau}_{N+1-i}$ denotes the estimated transmitter IQ skew for the mirror subchannel, and $$\frac{d}{df} \varphi_{N+1-i}(f)$$

denotes the slope of the phase response for the mirror subchannel plotted against frequency.

In an example of a preceding example aspect of the apparatus, the MIMO equalizer may be a 2×2 complex-valued multi-tap MIMO equalizer having four multi-tap equalizer coefficients, and the transmitter IQ skew may be computed for each of the two polarizations by: computing the multi-tap equalizer coefficients for the given subchannel by: obtaining soft symbols and hard decision symbols for the given subchannel and the mirror subchannel; obtaining multi-tap equalizer outputs from the MIMO equalizer, using the soft symbols of the given subchannel and a complex conjugate of the soft symbols of the mirror subchannel as inputs to the MIMO equalizer; and computing the multi-tap equalizer coefficients, using the hard decision symbols of the given subchannel and a complex conjugate of the hard decision symbols of the mirror subchannel as references. The transmitter IQ skew may be further computed by: computing the estimated transmitter IQ skew for the given subchannel using the multi-tap equalizer coefficients computed for the given subchannel; repeating the computation of the estimated transmitter IQ skew for all subchannels of the DSCM signal; and computing the transmitter IQ skew using the estimated transmitter IQ skew for all subchannels.

In an example of the preceding example aspect of the apparatus, computing the estimated transmitter IQ skew for the given subchannel may include: converting the multi-tap equalizer coefficients from time domain to frequency domain; extracting phase response for the given subchannel using the converted equalizer coefficients; and estimating the transmitter IQ skew for the given subchannel using a slope of the phase response.

In an example of the preceding example aspect of the apparatus, extracting phase response for the given subchannel using the converted equalizer coefficients may include: extracting the phase response for the given subchannel using an equation: $\varphi_i(f)= \measuredangle C(f)$ where $\varphi_i(f)$ denotes the phase response for the given subchannel, $f$ denotes frequency and where $C(f)$ is an empirical construct defined by the converted equalizer coefficients such that the slope of $\varphi_i(f)$, when plotted against frequency, is used to estimate the transmitter IQ skew for the given subchannel according to:

$$\hat{\tau}_i = \frac{1}{2\pi} \frac{d}{df} \varphi_i(f)$$

where $\hat{\tau}_i$ denotes the estimated transmitter IQ skew for the given subchannel, and $$\frac{d}{df} \varphi_i(f)$$

denotes the slope of we phase response for the given subchannel plotted against frequency.

In an example of a preceding example aspect of the apparatus, the MIMO equalizer may be a 4×4 real-valued single-tap MIMO equalizer having sixteen single-tap equalizer coefficients, and the transmitter IQ skew may be computed for each of the two polarizations by: computing the single-tap equalizer coefficients for the given subchannel by: obtaining soft symbols and hard decision symbols for the given subchannel and the mirror subchannel; obtaining single-tap equalizer outputs from the MIMO equalizer, using real and imaginary components the soft symbols of the given subchannel and real and imaginary components of the soft symbols of the mirror subchannel as inputs to the MIMO equalizer; and computing the single-tap equalizer coefficients, using real and imaginary components of the hard decision symbols of the given subchannel and real and imaginary components of the hard decision symbols of the mirror subchannel as references. The transmitter IQ skew may be further computed by: computing the estimated phase for the given subchannel and for the mirror subchannel using the single-tap equalizer coefficients computed for the given subchannel; repeating the computation of the estimated phase to obtain estimated phases for all subchannels of the DSCM signal; and computing the transmitter IQ skew using the estimated phases for all subchannels.

In an example of the preceding example aspect of the apparatus, the estimated phase for the given subchannel may be computed using a first equation: $\varphi_i = 2\measuredangle c$ where $\varphi_i$ denotes the estimated phase for the given subchannel; and the estimated phase for the mirror subchannel may be computed using a second equation: $\varphi_{N+1-i} = 2\measuredangle d$ where $\varphi_{N+1-i}$ denotes the estimated phase for the mirror subchannel; where c and d are empirical constructs each defined by the single-tap equalizer coefficients such that a slope of the estimated phases for all subchannels, plotted against center frequencies of the subchannels, is used to estimate the transmitter IQ skew according to:

$$\hat{\tau} = \frac{1}{2\pi} \frac{d}{df} \varphi_i$$

where $\hat{\tau}$ denotes the estimated transmitter IQ skew, and $$\frac{d}{df} \varphi_i$$

denotes the slope of the estimated phases for all subchannels plotted against the center frequencies of the subchannels.

In an example of a preceding example aspect of the apparatus, the MIMO equalizer may be a 2×2 complex-valued single-tap MIMO equalizer having four single-tap equalizer coefficients, and the transmitter IQ skew may be computed for each of the two polarizations by: computing the single-tap equalizer coefficients for the given subchannel by: obtaining soft symbols and hard decision symbols for the given subchannel and the mirror subchannel; obtaining single-tap equalizer outputs from the MIMO equalizer, using the soft symbols of the given subchannel and a complex conjugate of the soft symbols of the mirror subchannel as inputs to the MIMO equalizer; and computing the single-tap equalizer coefficients, using the hard decision symbols of the given subchannel and a complex conjugate of the hard decision symbols of the mirror subchannel as references. The transmitter IQ skew may be further computed by: computing the estimated phase for the given subchannel using the single-tap equalizer coefficients computed for the given subchannel; repeating the computation of the estimated phases for all subchannels of the DSCM signal; and computing the transmitter IQ skew using the estimated phases for all subchannels.

In an example of the preceding example aspect of the apparatus, the estimated phase for the given subchannel may be computed using an equation: $\varphi_i = 2\measuredangle c$ where $\varphi_i$ denotes the estimated phase for the given subchannel; where c is an empirical construct defined by the single-tap equalizer coefficients such that a slope of the estimated phases for all subchannels, plotted against center frequencies of the subchannels, is used to estimate the transmitter IQ skew according to:

$$\hat{\tau} = \frac{1}{2\pi} \frac{d}{df} \varphi_i$$

where $\hat{\tau}$ denotes the estimated transmitter IQ skew, and $$\frac{d}{df} \varphi_i$$

denotes the slope of the estimated phases for all subchannels plotted against the center frequencies of the subchannels.

In an example of any of the preceding example aspects of the apparatus, the processor may be implemented in the receiver of the apparatus, and the MIMO equalizer may be implemented in the receiver.

In an example of the preceding example aspect of the apparatus, the equalizer outputs may be provided to a decoder of the receiver, to assist in decoding the hard decision symbols.

In another example aspect, the present disclosure describes a method, including: receiving four channels of a digital subcarrier multiplexed (DSCM) signal received from a transmitter, the four channels corresponding to in-phase (I) and quadrature (Q) channels for each of two orthogonal polarizations; computing a transmitter IQ skew for each of the two polarizations by: computing equalizer coefficients for a given subchannel by: obtaining soft symbols and hard decision symbols for the given subchannel and a corresponding mirror subchannel; obtaining equalizer outputs from a multiple-input multiple-output (MIMO) equalizer, using the soft symbols of the given subchannel and the mirror subchannel as inputs to the MIMO equalizer; and computing equalizer coefficients, using the hard decision symbols of the given subchannel and the mirror subchannel as references, by minimizing error between the equalizer outputs and the references. The transmitter IQ skew is further computed by: computing an estimated phase or an estimated transmitter IQ skew for at least the given subchannel using the equalizer coefficients for the given subchannel; repeating the computation of the estimated phase or the estimated transmitter IQ skew, to obtain estimates for all subchannels of the DSCM signal; and computing the transmitter IQ skew for each of the two polarizations using the estimates for all subchannels. The method further includes: communicating the computed transmitter IQ skew for the two polarizations to the transmitter.

In an example of the preceding example aspect of the method, the

MIMO equalizer may be a 4×4 real-valued multi-tap MIMO equalizer having sixteen multi-tap equalizer coefficients, and the transmitter IQ skew may be computed for each of the two polarizations by: computing the multi-tap equalizer coefficients for the given subchannel by: obtaining soft symbols and hard decision symbols for the given subchannel and the mirror subchannel; obtaining multi-tap equalizer outputs from the MIMO equalizer, using real and imaginary components the soft symbols of the given subchannel and real and imaginary components of the soft symbols of the mirror subchannel as inputs to the MIMO equalizer; and computing the multi-tap equalizer coefficients, using real and imaginary components of the hard decision symbols of the given subchannel and real and imaginary components of the hard decision symbols of the mirror subchannel as references. The transmitter IQ skew may be further computed by: computing the estimated transmitter IQ skew for the given subchannel and for the mirror subchannel using the equalizer coefficients computed for the given subchannel; repeating the computation of the estimated transmitter IQ skew to obtain estimated transmitted IQ skews for all subchannels of the DSCM signal; and computing the transmitter IQ skew using the estimated transmitter IQ skew for all subchannels.

In an example of the preceding example aspect of the method, computing the estimated transmitter IQ skew for the given subchannel and the mirror subchannel may include: converting the multi-tap equalizer coefficients from time domain to frequency domain; extracting phase response for the given subchannel and for the mirror subchannel using the converted equalizer coefficients; and estimating the transmitter IQ skew for the given subchannel using a slope of the phase response of the given subchannel, and estimating the transmitter IQ skew for the mirror subchannel using a slope of the phase response of the mirror subchannel.

In an example of a preceding example aspect of the method, the MIMO equalizer may be a 2×2 complex-valued multi-tap MIMO equalizer having four multi-tap equalizer coefficients, and the transmitter IQ skew may be computed for each of the two polarizations by: computing the multi-tap equalizer coefficients for the given subchannel by: obtaining soft symbols and hard decision symbols for the given subchannel and the mirror subchannel; obtaining multi-tap equalizer outputs from the MIMO equalizer, using the soft symbols of the given subchannel and a complex conjugate of the soft symbols of the mirror subchannel as inputs to the MIMO equalizer; and computing the multi-tap equalizer coefficients, using the hard decision symbols of the given subchannel and a complex conjugate of the hard decision symbols of the mirror subchannel as references. The transmitter IQ skew may be further computed by: computing the estimated transmitter IQ skew for the given subchannel using the equalizer coefficients computed for the given subchannel; repeating the computation of the estimated transmitter IQ skew for all subchannels of the DSCM signal; and computing the transmitter IQ skew using the estimated transmitter IQ skew for all subchannels.

In an example of the preceding example aspect of the method, computing the estimated transmitter IQ skew for the given subchannel may include: converting the multi-tap equalizer coefficients from time domain to frequency domain; extracting phase response for the given subchannel using the converted equalizer coefficients; and estimating the transmitter IQ skew for the given subchannel using a slope of the phase response.

In an example of a preceding example aspect of the method, the MIMO equalizer may be a 4×4 real-valued single-tap MIMO equalizer having sixteen single-tap equalizer coefficients, and the transmitter IQ skew may be computed for each of the two polarizations by: computing the single-tap equalizer coefficients for the given subchannel by: obtaining soft symbols and hard decision symbols for the given subchannel and the mirror subchannel; obtaining single-tap equalizer outputs from the MIMO equalizer, using real and imaginary components the soft symbols of the given subchannel and real and imaginary components of the soft symbols of the mirror subchannel as inputs to the MIMO equalizer; and computing the single-tap equalizer coefficients, using real and imaginary components of the hard decision symbols of the given subchannel and real and imaginary components of the hard decision symbols of the mirror subchannel as references. The transmitter IQ skew may be further computed by: computing the estimated phase for the given subchannel and for the mirror subchannel using the equalizer coefficients computed for the given subchannel; repeating the computation of the estimated phase to obtain estimated phases for all subchannels of the DSCM signal; and computing the transmitter IQ skew using the estimated phases for all subchannels.

In an example of a preceding example aspect of the method, the MIMO equalizer may be a 2×2 complex-valued single-tap MIMO equalizer having four single-tap equalizer coefficients, and the transmitter IQ skew may be computed for each of the two polarizations by: computing the single-tap equalizer coefficients for the given subchannel by: obtaining soft symbols and hard decision symbols for the given subchannel and the mirror subchannel; obtaining single-tap equalizer outputs from the MIMO equalizer, using the soft symbols of the given subchannel and a complex conjugate of the soft symbols of the mirror subchannel as inputs to the MIMO equalizer; and computing the single-tap equalizer coefficients, using the hard decision symbols of the given subchannel and a complex conjugate of the hard decision symbols of the mirror subchannel as references. The transmitter IQ skew may be further computed by: computing the estimated phase for the given subchannel using the equalizer coefficients computed for the given subchannel; repeating the computation of the estimated phases for all subchannels of the DSCM signal; and computing the transmitter IQ skew using the estimated phases for all subchannels.

In another example aspect, the present disclosure describes a non-transitory computer readable medium that, when executed by a receiver, causes the receiver to perform any of the preceding example aspects of the method.

BRIEF DESCRIPTION OF THE DRAWINGS

Reference will now be made, by way of example, to the accompanying drawings which show example embodiments of the present application, and in which.

DETAILED DESCRIPTION

In examples disclosed herein, methods and apparatuses are described for far-end monitoring of in-phase and quadrature (IQ) time skew. Far-end monitoring of IQ skew refers to monitoring of transmitter IQ skew (i.e., the skew that occurs at a transmitter) by a receiver. To assist in understanding the present disclosure, FIG. 1 is first described.

Figure 1:
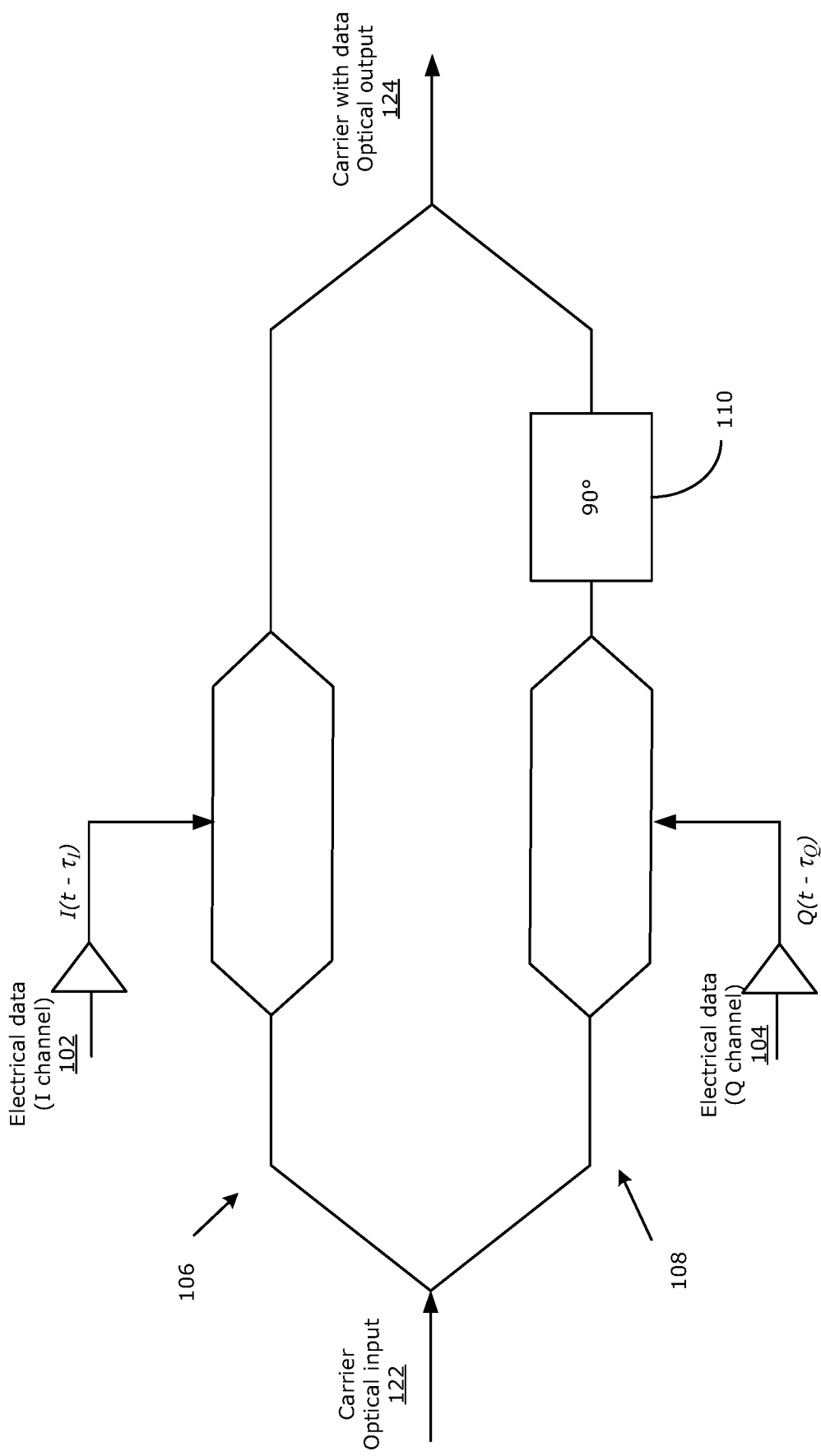
FIG. 1 is a schematic of an example in-phase and quadrature modulation.

FIG. 1 is a schematic illustrating an example of IQ modulation, which may be performed using an electro-optical modulator (EOM), such as a IQ Mach-Zehnder Modulator (IQ-MZM), or other suitable optical modulator at a transmitter. An in-phase (I) path 106 is modulated by an analog electrical data I channel 102 and a quadrature (Q) path 108 is modulated by an analog electrical data Q channel 104.

A carrier is received as optical input 122, for example in the form of a laser providing a light source at a particular frequency (e.g., about 193 THz). The optical input 122 is split into the I path 106 and Q path 108 in accordance with optical interferometry techniques. The I path 106 receives an analog electrical signal from the I channel 102, which modulates the I component of the optical carrier signal propagated through the I path 106. The Q path 108 receives an analog electrical signal from the Q channel 104, which modulates a Q component of the optical carrier signal propagated through the Q path 108. The Q path 108 passes through a phase shifter 110 that applies a phase shift of about 90°. The optical signal output of the I path 106 and the optical signal output of the Q path 108 are coupled or combined to form an optical output 124 (which is the optical carrier modulated with the data). The signal at the output 124 is an optical quadrature amplitude modulation (QAM) signal, where the term "optical" indicates that the QAM signal is carried by an optical carrier. Because there are two polarizations (X- and Y-polarizations), the signal at the output 124 may also be referred to as a dual-polarization optical signal.

The IQ skew is a relative delay between the data path of the I channel 102 and the data path of the Q channel 104, which may be defined as:

$$\tau_{IQ} = \tau_Q - \tau_I$$

where $\tau_{IQ}$ is the IQ skew, $\tau_Q$ is the time delay of the I path 106, and $\tau_I$ is the time delay of the Q path 108. The IQ skew is caused by a physical time delay difference between the I channel 102 and Q channel 104. The time delay in these channels 102, 104 may be caused by imperfections in the physical components, which may include, for example, a digital-to-analog converter (DAC) used to generate the analog channels from digital inputs, a driver used to drive the EOM, the EOM itself, and/or the printed circuit board (PCB) wires used by the transmitter.

At the receiver side (not shown in FIG. 1), the received optical signal is converted into an electrical signal by an optical coherent receiver, in order to recover the data on the I channel and on the Q channel. Details of the receiver are discussed further below.

The present disclosure describes apparatuses and methods for far-end monitoring of transmitter skew in a digital subcarrier multiplexed (DSCM) system (i.e., an optical communication system that transmits DSCM signals). Unlike conventional single-carrier (SC) signals, a DSCM signal consists of a group of frequency-multiplexed QAM signals carried in a group of subcarriers (or subchannels) digitally generated by a single transmitter via electrical data on the channels 102 and 104 in FIG. 1.

Figure 2A:
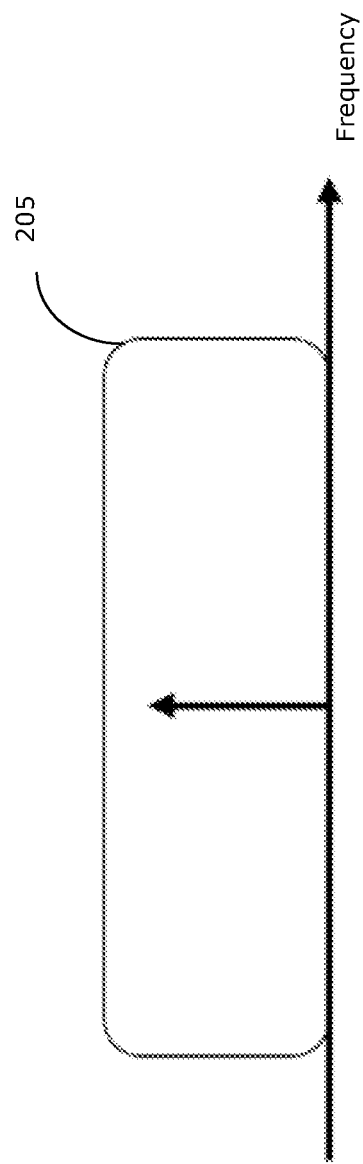
FIGS. 2A and 2B illustrate examples of a SC QAM signal and a DSCM signal, respectively.
Figure 2B:
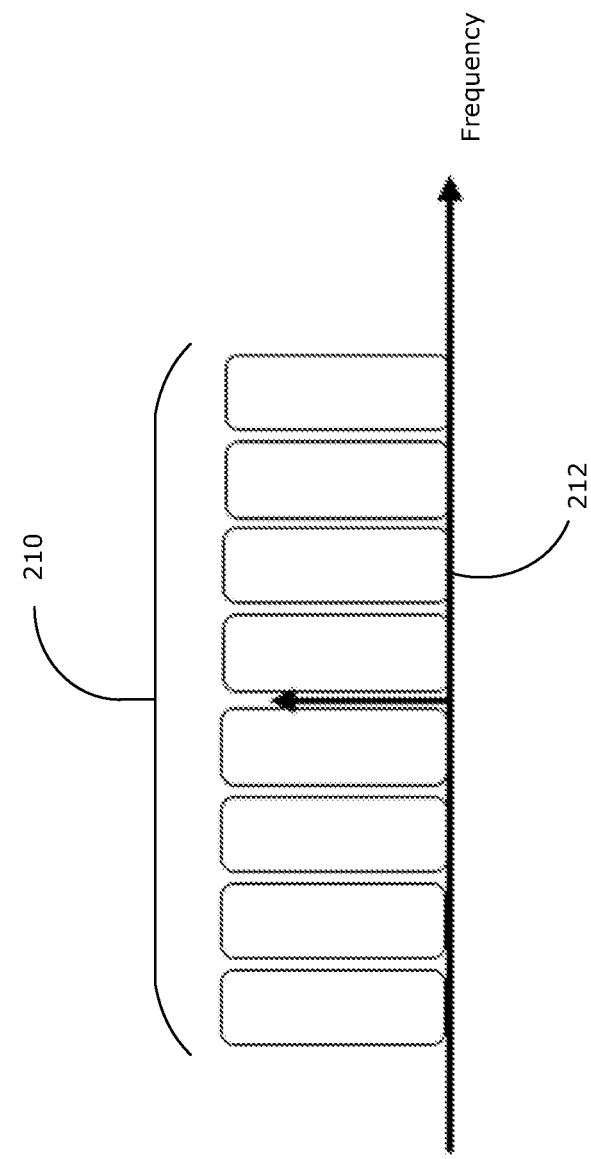

FIGS. 2A and 2B illustrate examples of a SC QAM signal (FIG. 2A) and a DSCM signal (FIG. 2B).

As shown in FIG. 2A, a SC QAM signal 205 typically is a single double side band (DSB) signal. This means that the SC QAM signal 205 has both positive and negative frequency components, with respective to the carrier frequency. In contrast, as shown in FIG. 2B, a DSCM signal 210 is formed by multiple subchannels 212 (or subcarriers) each containing a respective coherent signal (e.g., a respective 64 QAM signal). The subchannels 212 are multiplexed in the frequency domain, meaning that each subchannel 212 is digitally frequency-shifted to a respective different subcarrier frequency (at a respective center frequency) such that the subchannels 212 do not overlap in frequency. Thus, the DSCM signal 210 is a group of non-overlapping single side band (SSB) signals. By SSB it is meant that the signal in each subchannel 212 contains only positive or only negative frequency components, with respective to the carrier frequency.

Figure 3A:
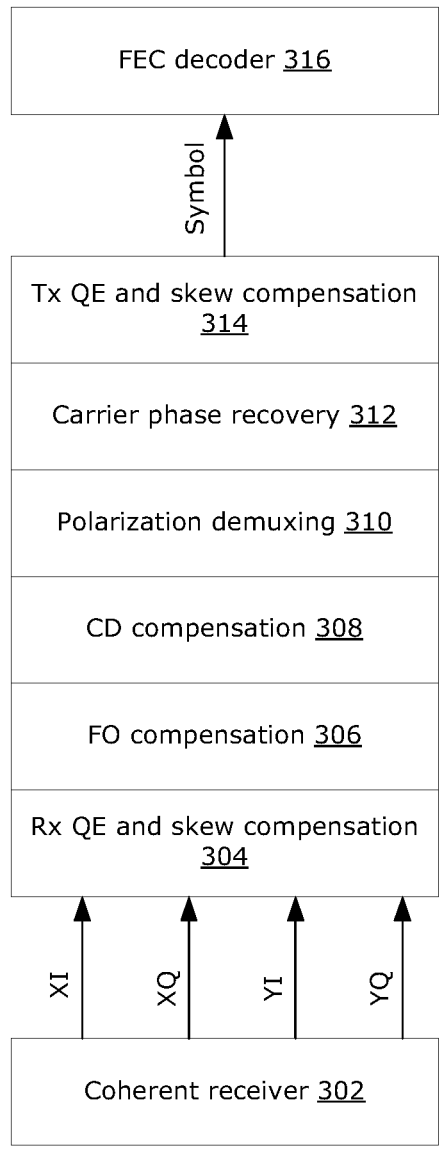
FIG. 3A is a block diagram illustrating an example DSP architecture that may be implemented by a conventional SC receiver.

FIG. 3A is a block diagram illustrating an example digital signal processing (DSP) architecture, which may be implemented by a conventional receiver for receiving SC QAM signals (also referred to as a SC receiver).

The SC QAM signal is received at a coherent receiver 302, which down-converts the received signal from the optical carrier frequency to the baseband electrical signal (local oscillator is not shown here). The down-converted signal has four channels that may be referred to as XI (denoting the I channel of the X-polarized signal), XQ (denoting the Q channel of the X-polarized signal), YI (denoting the I channel of the Y-polarized signal) and YQ (denoting the Q channel of the Y-polarized signal). The XI, XQ, YI and YQ channels are processed using existing DSP operations, including receiver (Rx) quadrature-phase error (QE) and skew compensation 304, frequency offset (FO) compensation 306, chromatic dispersion (CD) compensation 308, polarization demultiplexing (demuxing) 310, carrier phase recovery 312 and transmitter (Tx) QE and skew compensation 314. Both hard-decision symbols and soft symbols are available at this point. Soft symbols represent the probability distribution of the recovered waveform sampled at one sample per symbol, whereas hard decision symbols are the estimated transmitted symbols which take on a set of discrete complex values. Often, soft symbols can provide information that can improve the performance of a decoder. The resulting hard and soft symbols are inputted to a decoder, such as a forward error correction (FEC) decoder 316.

It should be noted that, in the conventional SC receiver (as shown in FIG. 3), the transmitter skew of X or Y-polarizations is estimated at the Tx QE and skew compensation block 314, which may be implemented using a 2×2 real-valued multiple-input multiple-output (MIMO) equalizer for each polarization. However, the transmitter skew estimation that is used in SC systems is not suitable for DSCM systems.

Figure 3B:
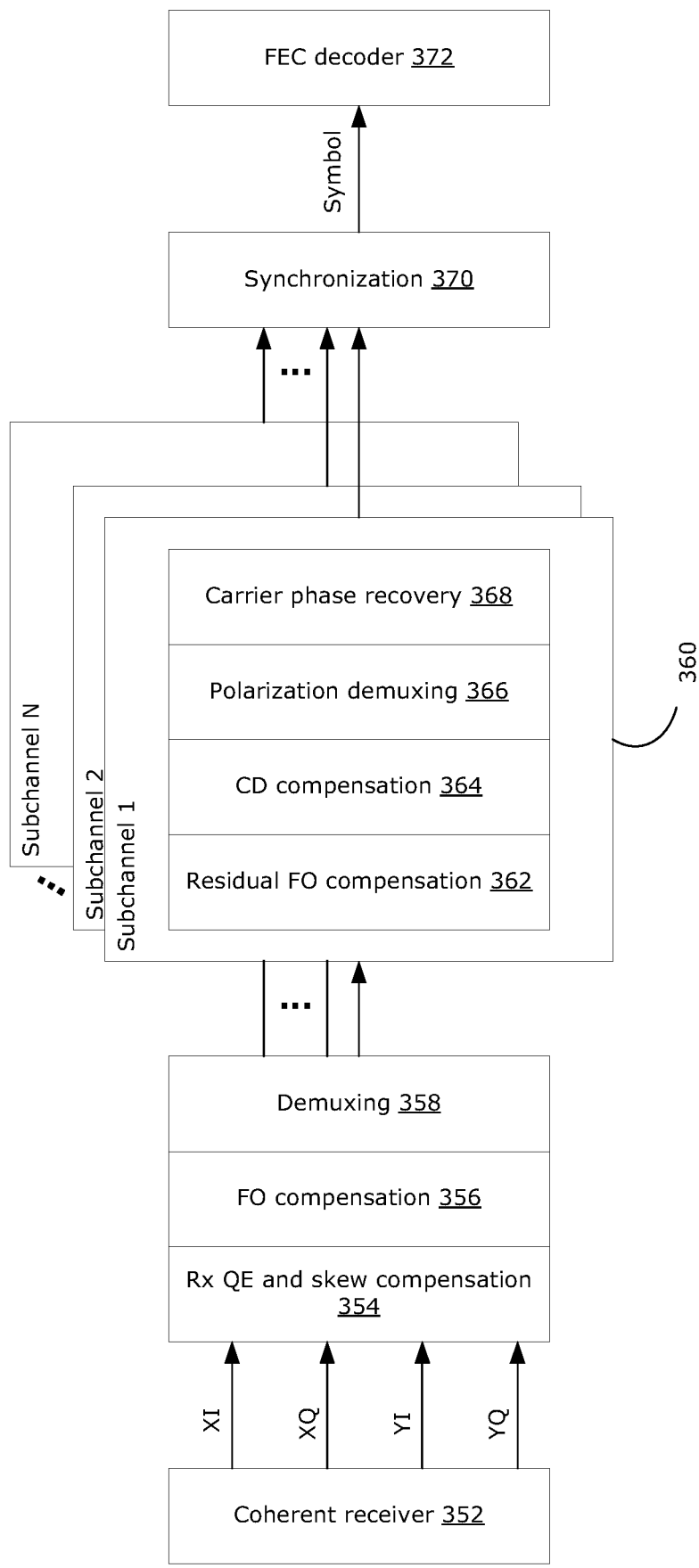
FIG. 3B is a block diagram illustrating an example DSP architecture that may be implemented by a conventional DSCM receiver.

FIG. 3B is a block diagram illustrating an example DSP architecture, which may be implemented by a conventional receiver for receiving DSCM signals (also referred to as a DSCM receiver).

The DSCM signal is received by a coherent receiver 352, which converts the received signal to the electrical signal, to obtain the XI, XQ, YI and YQ channels. The XI, XQ, YI and YQ channels are processed using DSP operations, including Rx QE and skew compensation 354 and FO compensation 356. Because the DSCM signal is a group of frequency-shifted SSB QAM signals, demultiplexing (demuxing) 358 is performed (in the frequency domain) to separate each subchannel. Each subchannel is down-converted from the subcarrier frequency (i.e., the center frequency of the subchannel) to the baseband. Each subchannel is processed independently using DSP operations in a respective subchannel block 360, including residual FO compensation 362, CD compensation 364, polarization demultiplexing (demuxing) 366 and carrier phase recovery 368. Carrier phase recovery 368 may output both hard symbols and soft symbols. Synchronization 370 is performed on the symbols (both hard and soft) from each subchannel, and the resulting symbols are inputted to a decoder, such as a FEC decoder 372.

DSP algorithms used by the SC receiver for recovering SC signals and estimating transmitter skew are not suitable for recovering DSCM signals at the DSCM receiver. A reason for this is that the SC receiver estimates transmitter skew using an algorithm that relies on the SC signals being DSB signals, whereas the subchannels in DSCM signals are SSB signals.

Further, DSP algorithms typically use least mean squares (LMS) or minimum mean square error (MMSE) algorithms that generally rely on the regular QAM symbols as references for optimization. However, a DSCM signal is a non-interpretable waveform generated by a group of frequency-shifted SSB QAM signals on respective subchannels, rather than a waveform generated by a single DSB QAM signal. Each subchannel is recovered independently, and in practice it is not possible to reconstruct the equivalent DSCM waveforms as references for LMS or MMSE algorithms.

A characteristic of a DSCM signal is that subchannels can be paired such that two subchannels are "mirrored" about the carrier frequency. By a pair of "mirrored" subchannels, it is meant that the pair of subchannels have respective center frequencies having the same magnitude frequency separation from the carrier frequency but the frequency separation is opposite in sign. Two subchannels that are paired in this way may be referred to as a pair of mirror subchannels.

Figure 4:
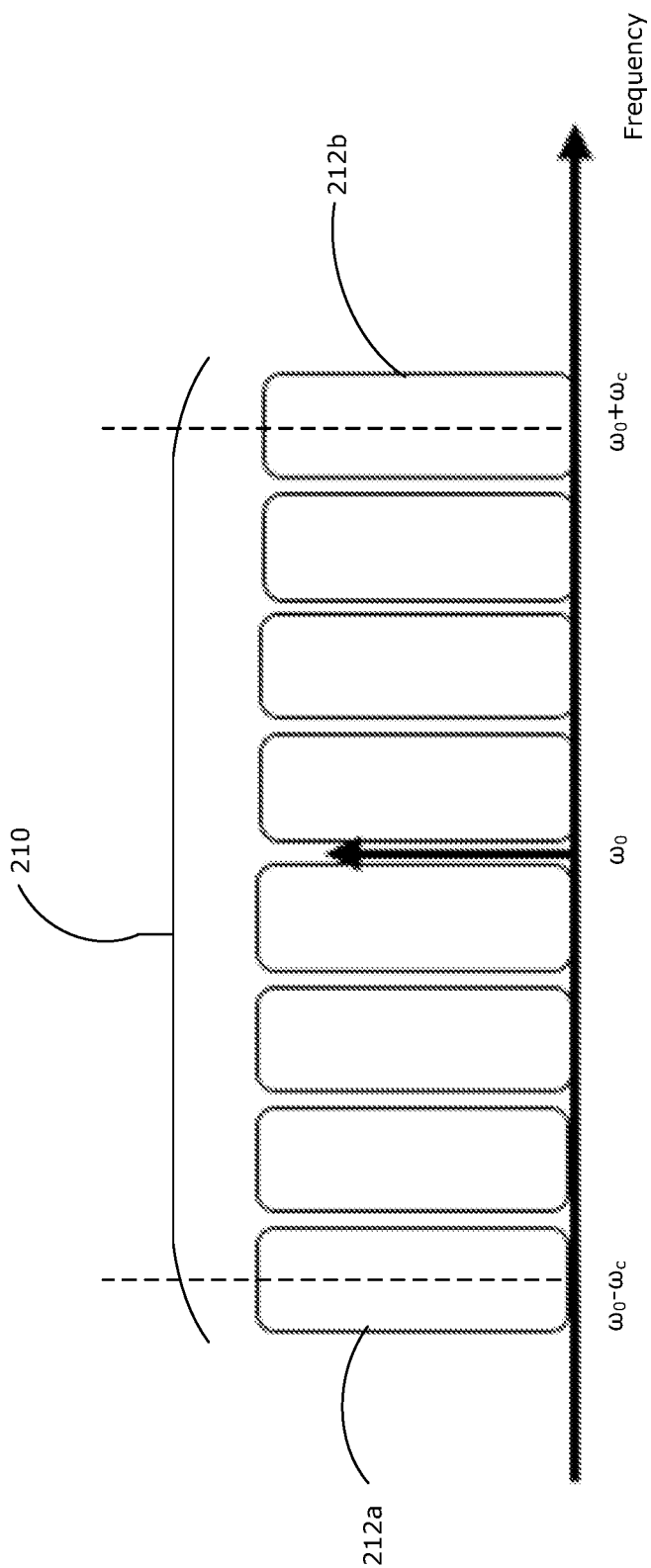
FIG. 4 illustrates an example DSCM signal, indicating a pair of mirror subchannels.

FIG. 4 illustrates an example DSCM signal, indicating a pair of mirror subchannels.

In this simplified example, the DSCM signal 210 includes eight subchannels that are each frequency-shifted with respect to the carrier frequency, denoted $\omega_0$. It should be noted that the present disclosure is applicable to DSCM signals having an odd number of subchannels as well as DSCM signals having an even number of subchannels. In the case where there is an odd number of subchannels, the channel located at the carrier frequency may be treated as a single DSB subchannel and conventional techniques developed for DSB signals may be used, and the remaining subchannels may be paired into mirror pairs as disclosed herein. In particular, a first subchannel 212a is located at a first center frequency denoted $\omega_0-\omega_c$ and a second subchannel 212b is located at a second center frequency denoted $\omega_0+\omega_c$. In other words, the first subchannel 212a has a frequency difference of $-\omega_c$ from the carrier frequency $\omega_0$ and the second subchannel 212b has a frequency difference of $+\omega_0$ from the carrier frequency coo. Both the first and second subchannels 212a, 212b have the same magnitude frequency difference of $|\omega_c|$ from the carrier frequency $\omega_0$, but the actual frequency differences are opposite in sign. Thus, the first and second subchannels 212a, 212b may be referred to herein as a pair of mirror subchannels (e.g., if the first subchannel 212a is given, then the second subchannel 212b is the corresponding mirror subchannel). Further, the first subchannel 212a may be referred to as the "negative" mirror subchannel to indicate that the first subchannel 212a has a negative frequency difference of $-\omega_c$ from the carrier frequency wo and the second subchannel 212b may be referred to as the "positive" mirror subchannel to indicate that the second subchannel 212b has a positive frequency difference of $+\omega_c$ from the carrier frequency $\omega_0$. However, it should be understood that the positive mirror subchannel (i.e., the second subchannel 212b) does not necessarily have a positive center frequency (i.e., $\omega_0+\omega_c$ is not necessarily a positive frequency) and similarly the negative mirror subchannel (i.e., the first subchannel 212a) does not necessarily have a negative center frequency (i.e., $\omega_0-\omega_c$ is not necessarily a negative frequency).

In DSCM systems, the presence of transmitter IQ skew (or other IQ imbalance) may cause images (also referred to as crosstalk or interference) between a pair of mirror subchannels. Generally, the presence of IQ skew causes interference from the negative mirror subchannel to appear in the positive mirror subchannel and vice versa. The data on different subchannels are independent of each other, therefore the interference from mirror subchannels act as unknown and independent noise. The result is that the signal in the negative mirror subchannel cannot be accurately reconstructed due to the incomplete cancellation of the interference from the positive mirror subchannel; and similarly the signal in the positive mirror subchannel cannot be accurately reconstructed due to the incomplete cancellation of the interference from the negative mirror subchannel. This can significantly degrade the performance of the DSCM system.

It may be noted that, in SC systems, the SC signal is a DSB signal that has both positive and negative frequency components (it should be noted that the terms positive and negative frequency components are used with reference to the carrier frequency, and are not strictly positive or negative in frequency). Existing algorithms make use of this characteristic to cancel the impairment caused by transmitter IQ skew. However, such existing algorithms do not work for DSCM systems, because each of the subchannels contain only positive or only negative frequency components and are processed independently after demultiplexing (e.g., see FIG. 3B).

Thus, existing techniques for monitoring and compensating for transmitter IQ skew in SC systems are not suitable for use in DSCM systems.

The present disclosure describes example apparatuses and methods for monitoring transmitter IQ skew by far-end receivers in DSCM systems. The disclosed examples may be implemented using existing receiver hardware (e.g., implemented via DSP in software or existing processors). The monitored transmitter IQ skew may be communicated by the receiver back to the transmitter via optical paths, to enable IQ skew correction at the transmitter for example.

Figure 5A:
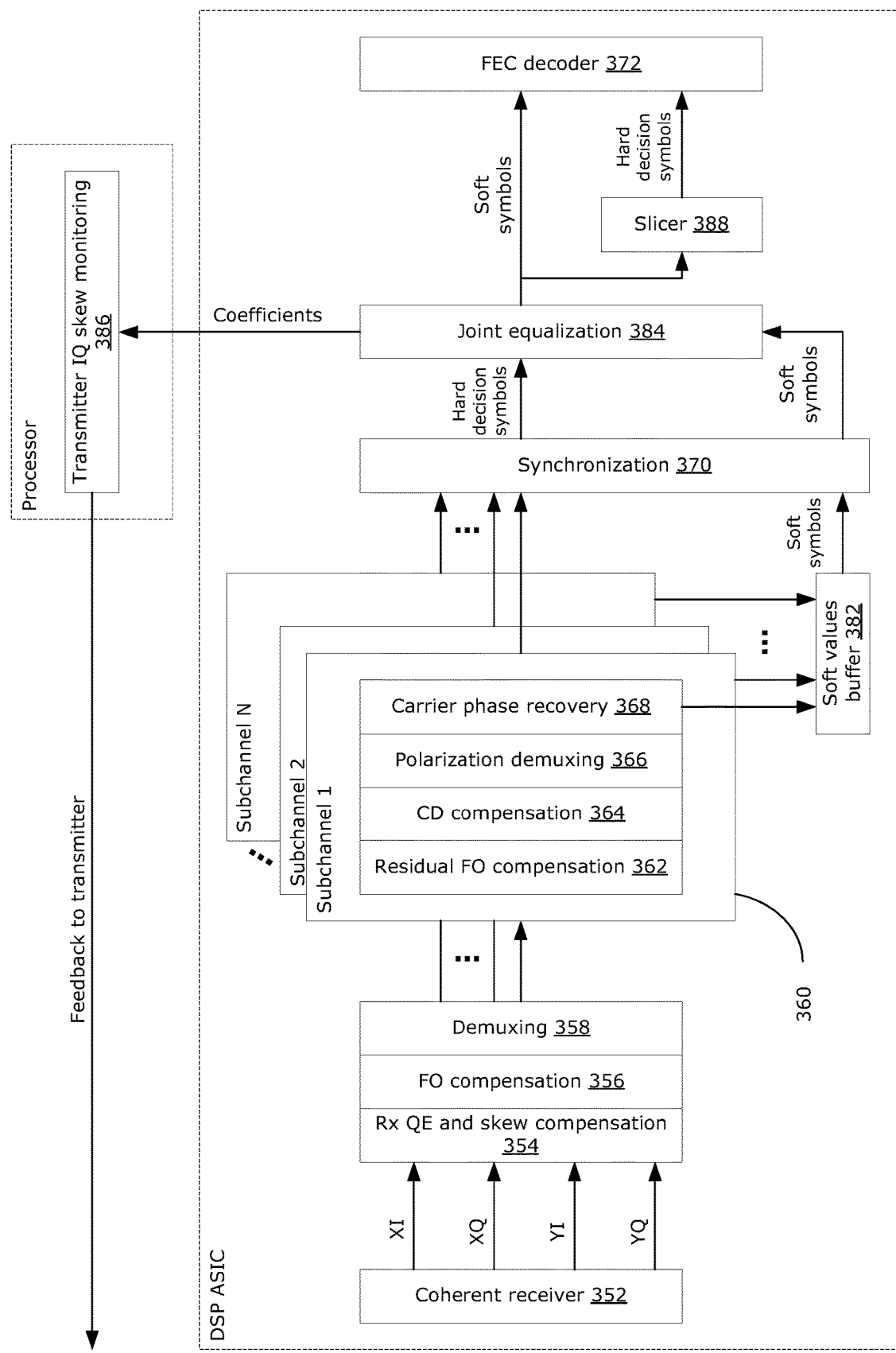
FIGS. 5A and 5B are block diagrams illustrating example architectures that may be implemented by a DSCM receiver in accordance with examples of the present disclosure.
Figure 5B:
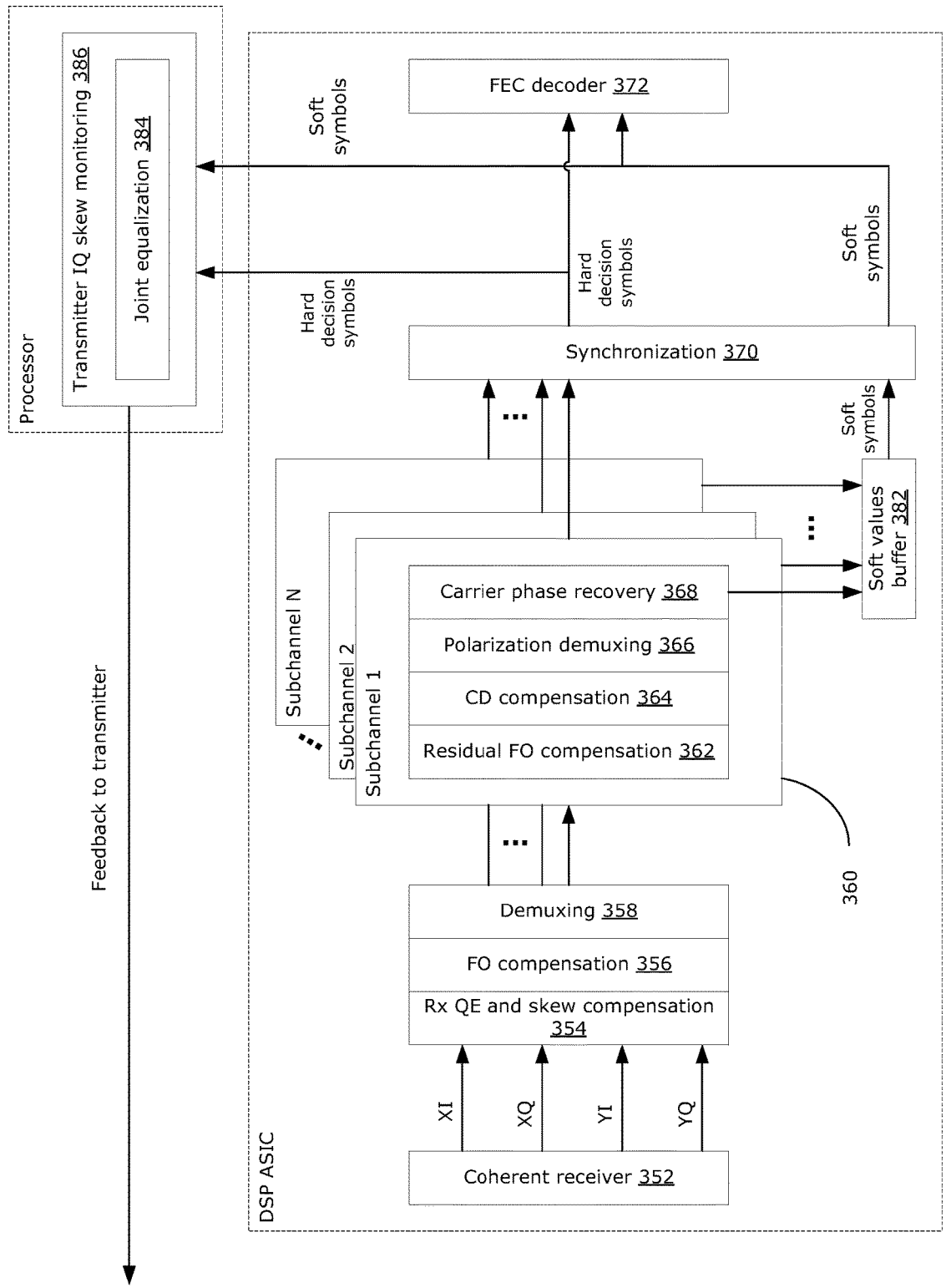

FIGS. 5A and 5B are a block diagrams illustrating example receiver architectures, which may be implemented by a DSCM receiver in accordance with examples of the present disclosure.

The examples of FIGS. 5A and 5B include DSP blocks similar to that of FIG. 3B, which do not need to be described here in detail. FIGS. 5A and 5B include an additional soft values buffer 382, joint equalization block 384 and transmitter IQ skew monitoring block 386. The soft values buffer 382 stores the soft symbols from the carrier phase recovery 368 of each subchannel block 360 (although it should be noted that other means of temporarily storing the soft symbols may be used, and the soft values buffer 382 may not be necessary). The soft symbols are the probabilistic values computed by the carrier phase recovery block 368, prior to mapping to a symbol (i.e., prior to the "hard decision" symbols). The soft symbols from each subchannel are inputted (e.g., from the soft values buffer 382), after synchronization 370, to the joint equalization block 384, which performs computations for a joint equalization (described further below) to cancel the crosstalk between a mirror pair of subchannels. Equalizer coefficients computed from the joint equalization block 384 are provided to the transmitter IQ skew monitoring block 386, which estimate the transmitter IQ skew and communicates the transmitter IQ skew back to the transmitter, to enable the transmitter to perform IQ skew compensation (e.g., using any suitable existing compensation techniques). The transmitter IQ skew monitoring block 386 may be implemented in a processor that is external to (and attached to) the DSP application-specific integrated circuit (ASIC). The processor may be any suitable slower-rate microprocessor (e.g., slower than the DSP ASIC rate) that is conventionally implemented in a DSCM receiver, for example. It should be noted that, because the transmitter IQ skew monitoring block 386 may not need to monitor for transmitter IQ skew continuously (e.g., due to relatively slow drift), the equalizer coefficients outputted from the joint equalization block 384 may be stored in a buffer (not shown) and accessed by the transmitter IQ skew monitor block 386 only when a monitoring request is triggered. For example, the monitoring request may be triggered at regular intervals (e.g., every few minutes, such as every five minutes) or on demand (e.g., manually triggered).

In the example of FIG. 5A, the joint equalization block 384 is implemented in the DSP ASIC. The example shown in FIG. 5A may be implemented in the case where the DSCM receiver has a DSP ASIC that has sufficient capabilities to implement a MIMO equalizer and to compute equalizer coefficients as discussed further below. In such examples, the soft symbols are outputted from the equalization block 384 to the FEC decoder 372. The soft symbols are also processed by a slicer 388 (or other hard decision module that converts the soft symbols to hard decision symbols) into hard decision symbols that are provided to the FEC decoder 372. The equalized outputs may compensate for crosstalk between pairs of mirror subchannels, thus providing the equalized outputs to the FEC decoder 372 may result in better overall system performance.

In the example of FIG. 5B, the joint equalization block 384 is implemented outside of the DSP ASIC, for example as part of the transmitter IQ skew monitoring block 386 (e.g., in a slower-rate microprocessor attached to the DSP ASIC). The example shown in FIG. 5B may be implemented in the case where the DSCM receiver has a DSP ASIC that does not have sufficient capabilities to implement a MIMO equalizer and to compute equalizer coefficients. As shown in FIG. 5B, the soft symbols (e.g., outputted from the soft values buffer 382), after synchronization 370, are provided to the joint equalization block 384 together with the hard decision symbols following synchronization 370. The soft symbols and the hard decision symbols, after synchronization 370, are provided to the FEC decoder 372. Unlike the example of FIG. 5A, the inputs to the FEC decoder 372 are not equalized by the equalization block 384.

Regardless of the exact implementation location of the joint equalization block 384, joint equalization of the positive and negative mirror subchannels (i.e., pair of mirror subchannels) is performed (e.g., using a MIMO equalizer implemented in the joint equalization block 384), using the soft symbols and hard decision symbols, and the transmitter IQ skew is estimated using the equalizer coefficients after optimization. As such, although two possible example implementations are shown in FIGS. 5A and 5B, the present disclosure is not limited to these example implementations and other implementations may be possible within the scope of the present disclosure.

To assist in understanding the computation performed by the joint equalization block 384, some notation is first introduced.

In the following discussion, N denotes the number of subchannels in a DSCM signal and i denotes the subchannel index, where i is an integer from 1 to N. $\{a_i\}$ denotes a time series of soft-valued (i.e., before hard decision) complex-valued symbols from the outputs of the carrier phase recovery block 368 of the $i^{th}$ subchannel. $\{a_{N+1-i}\}$ denotes a time series of the complex conjugate of the soft-valued (i.e., before hard decision) complex-valued symbols of the outputs of the carrier phase recovery block of the $(N+1-i)^{th}$ subchannel (which is the mirror subchannel for the $i^{th}$ subchannel). $\{d_{a,i}\}$ denotes a time series of complex-valued hard-decision symbols of the outputs of the carrier phase recovery block 368 of the $i^{th}$ subchannel (where the subscript a stands in for the two polarization channels, i.e., a=$\{x,y\}$). $\{d^*_{a,N+1-i}\}$ denotes the time series of the complex conjugate of the complex-valued hard-decision symbols of the outputs of the carrier phase recovery block 368 of the $(N+1-i)^{th}$ subchannel. $\{a'_i\}$ denotes a time series of equalized (i.e., outputted by the MIMO equalizer) soft-valued complex-valued symbols of the $i^{th}$ subchannel. $\{a'_{N+1-i}{}^*\}$ denotes a time series of equalized (i.e., outputted by the MIMO equalizer) complex conjugate of the soft-valued complex-valued symbols of the $(N+1-i)^{th}$ subchannel.

Figure 6:
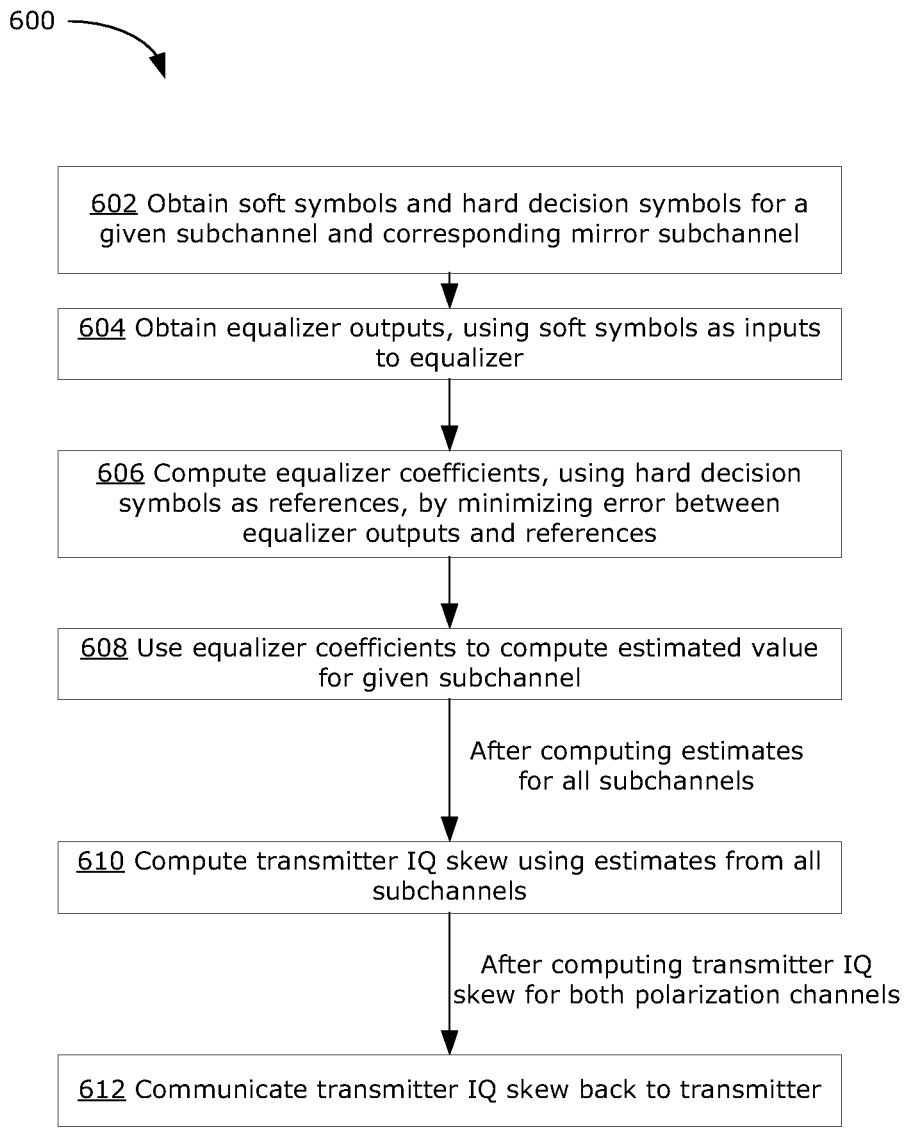
FIG. 6 is a flowchart illustrating an example method for estimating transmitter IQ skew using joint equalization of paired mirror subchannels, in accordance with examples of the present disclosure.

FIG. 6 is a flowchart illustrating an example method 600 for estimating transmitter IQ skew using joint equalization of paired mirror subchannels. The method 600 may be performed using the example receiver implementation illustrated in FIG. 5A or the example receiver implementation illustrated in FIG. 5B. If the implementation shown in FIG. 5A is used, steps 602 to 606 of the method 600 may be performed using fast computation in the DSP ASIC, to provide equalized output to the FEC decoder 372 and thus enable improvements in system performance. If the implementation shown in FIG. 5B is used, steps 602 to 606 of the method 600 may be performed using slower computation by the slower-rate processor outside of the DSP ASIC. Regardless of the implementation, steps 608 to 612 may be performed outside of the DSP ASIC, using the slower-rate processor.

As will be described below, the method 600 makes use of a time-domain MIMO equalizer (e.g., implemented in the joint equalization block 384). The MIMO equalizer may be implemented in various ways, such as a 2×2 complex-valued multi-tap MIMO equalizer (described specifically with respect to FIG. 7), a 2×2 complex-valued single-tap MIMO equalizer (described specifically with respect to FIG. 8), a 4×4 real-valued multi-tap MIMO equalizer (described specifically with respect to FIG. 9) or a 4×4 real-valued single-tap MIMO equalizer (described specifically with respect to FIG. 10). The two polarization channels may be equalized using the MIMO equalizer simultaneously or sequentially, depending on the receiver implementation. For example, if the receiver implementation shown in FIG. 5A is used, where the joint equalization block 384 is implemented in the DSP ASIC, the joint equalization block 384 may implement two identical MIMO equalizers to simultaneously equalize both the X- and Y-polarizations in real-time. This enables the equalized output to be provided to the FEC decoder 372 in real-time, to help improve decoding performance as discussed above. If the receiver implementation shown in FIG. 5B is used, where the joint equalization block 384 is implemented outside of the DSP ASIC (and the equalized output is not provided to the FEC decoder 372), it is not necessary for the X- and Y-polarizations to be equalized in real-time and the two polarization channels may be equalized sequentially (e.g., starting with X-polarization) using a single MIMO equalizer implemented in the joint equalization block 384. Regardless of whether the two polarization channels are equalized simultaneously or sequentially, computation of the transmitter IQ skew for the two polarization channels may be performed in parallel or in sequence. In general, because transmitter IQ skew is expected to change relatively slowly, the timing of the transmitter IQ skew computation (using the equalizer coefficients) for each polarization channel is less critical. The method 600 may be performed by first computing the transmitter IQ skew for one of the two polarization channels (e.g., starting by selecting X-polarization). As will be discussed further below, the transmitter IQ skew for the other polarization channel (e.g., the Y-polarization) is computed subsequently.

At 602, the soft symbols and hard decision symbols are obtained (e.g., from the soft values buffer 382 and from the channel phase recovery block 368) after synchronization 370 for a given subchannel (also referred to as the $i^{th}$ subchannel) and also for the corresponding mirror subchannel. As previously defined, the corresponding mirror subchannel for a first subchannel is a second subchannel such that the first and second subchannels have respective center frequencies that have the same magnitude frequency difference from the carrier frequency and the frequency difference differ only in sign.

Specifically, if the given subchannel is the $i^{th}$ subchannel out of a total of N subchannels, then the corresponding mirror subchannel is the $(N-i+1)^{th}$ subchannel (where the subchannels are indexed from 1 to N, in order of the center frequencies). It should be noted that each subchannel in a pair of mirror subchannels have equal (or substantially equal) bandwidth (i.e., the $i^{th}$ subchannel has equal or substantially equal bandwidth as the $(N-i+1)^{th}$ subchannel), although it is not necessary for all N subchannels to have the same bandwidth.

At 604, the soft symbols are provided as inputs to the time domain MIMO equalizer, to obtain equalizer outputs. As will be discussed below, depending on the specific implementation of the MIMO equalizer, in some examples providing the soft symbols to the MIMO equalizer may involve obtaining the complex conjugate of the soft symbols for the mirror subchannel. In other examples, providing the soft symbols to the MIMO equalizer may involve separating the complex-valued soft symbols into real and imaginary components. Further details will be described with respect to FIGS. 7-10.

At 606, the equalizer coefficients are computed, using the hard decision symbols of the given subchannel and the corresponding mirror subchannel as references. In some examples, depending on the specific implementation of the MIMO equalizer, the hard decision symbols of the given subchannel and the complex conjugate of the hard decision symbols of the corresponding mirror subchannel may be used as references. In other examples, the real and imaginary components of the hard decision symbols of the given subchannel and the mirror subchannel may be used as references. Further details will be described with respect to FIGS. 7-10.

The equalizer coefficients are computed by minimizing the error between the equalizer outputs and the references. Minimization of the error may also be referred to as optimization of the equalizer coefficients (or filter coefficients). Various techniques may be used to compute the equalizer coefficients, including minimization techniques such as LMS or least squares (LS), among other possibilities As previously mentioned, steps 602 to 606 may be performed in real-time in the case where the joint equalization block 384 is implemented in the DSP ASIC (e.g., as shown in FIG. 5A), with the X- and Y-polarization channels being equalized in parallel using two MIMO equalizers in the joint equalization block 384. Steps 608 to 610 may then be performed using the slower-rate processor external to the DSP ASIC, with the transmitter IQ skew for the X- and Y- being computed in sequence. In other examples, steps 602 to 606 may not be performed in real-time in the case where the joint equalization block 384 is implemented in a slower-rate processor external to the DSP ASIC (e.g., as shown in FIG. 5B), instead steps 602 to 610 may be performed for each polarization channel in sequence (i.e., steps 602 to 610 are first performed for one polarization channel, then repeated for the other polarization channel).

At 608, the equalizer coefficients are used to compute an estimated value for the given subchannel. As will be discussed further below, the estimated value may be an estimated transmitter IQ skew for the given subchannel (e.g., if a multi-tap MIMO equalizer is used), or may be an estimated phase for the given subchannel (e.g., if a single-tap MIMO equalizer is used). Additionally, in some examples, an estimated value may be computed for both the given subchannel and for the corresponding mirror subchannel (e.g., if a real-valued MIMO equalizer is used).

Steps 602 to 608 are performed to obtain an estimated value for other subchannels. Depending on the implementation of the MIMO equalizer (described in greater detail below with respect to FIGS. 7-10), steps 602 to 608 are performed for all subchannels (i.e., for i=1, . . . , N) or are performed for half of the subchannels (i.e., for i=1, . . . , N/2). It may be noted that, if the joint equalization block 384 is implemented in the DSP ASIC (e.g., as shown in FIG. 5A), steps 602 to 606 may be performed to obtain equalizer coefficients for the subchannels in real-time, then step 608 may be performed not in real-time for the subchannels (e.g., all N subchannels or only N/2 subchannels, depending on implementation of the MIMO equalizer). Alternatively, if the joint equalization block 384 is implemented outside of the DSP ASIC (e.g., as shown in FIG. 5B), steps 602 to 608 may be performed not in real-time for the subchannels (e.g., all N subchannels or only N/2 subchannels, depending on implementation of the MIMO equalizer). After estimates for all subchannels have been computed, the method 600 proceeds to step 610.

At 610, the transmitter IQ skew is computed using the estimates from all the subchannels. As previously mentioned, the transmitter IQ skew may be computed for each polarization channel in parallel or in sequence. If the transmitter IQ skew for both polarization channels have been computed, the method 600 may proceed to step 612. Otherwise, if the transmitter IQ skew is first computed for one selected polarization channel (e.g., X-polarization selected first) the method 600 may return to a previous step to perform computations for the other polarization channel.

If the equalizer coefficients were computed for both the X- and Y-polarizations in parallel (e.g., in the case where the joint equalization block 384 is implemented in the DSP ASIC as shown in FIG. 5A), step 608 may be performed to compute estimated values for both polarization channels in parallel and the transmitter IQ skew may be computed at step 610 for both polarization channels in parallel. If the equalizer coefficients were computed for only one polarization channel (e.g., in the case where the joint equalization block 384 is implemented outside of the DSP ASIC as shown in FIG. 5B), the method 600 returns to step 602 to similarly compute the transmitter IQ skew for the other polarization channel.

After the transmitter IQ skew has been computed for both polarization channels, the method proceeds to step 612.

At 612, the transmitter IQ skew is communicated back to the transmitter. For example, the computed transmitter IQ skew for the X- and Y-polarizations may be provided to the transmitter IQ skew monitoring block 386, which communicates the transmitter IQ skew as feedback to the transmitter.

As mentioned previously, the MIMO equalizer that is used for the joint equalization computation may be implemented in various ways. FIGS. 7-10 illustrate some details of how the method 600 may be implemented, depending on the implementation of the MIMO equalizer. As explained with respect to the method 600, steps for computing equalizer coefficients may be performed in real-time if the joint equalization block 384 is implemented in the DSP ASIC. Other steps may be performed not in real-time using a joint equalization block 384 implemented in a slower-rate processor external to the DSP ASIC. Further, equalization of the two polarization channels may be performed in parallel in real-time if the joint equalization block 384 is implemented in the DSP ASIC, or may be performed sequentially and not in real-time using a joint equalization block 384 implemented in a slower-rate processor external to the DSP ASIC. Thus, the timing and order of the steps illustrated in FIGS. 7-10 may change depending on specific hardware implementation, the details of which have been previously described and need not be repeated here.

Figure 7:
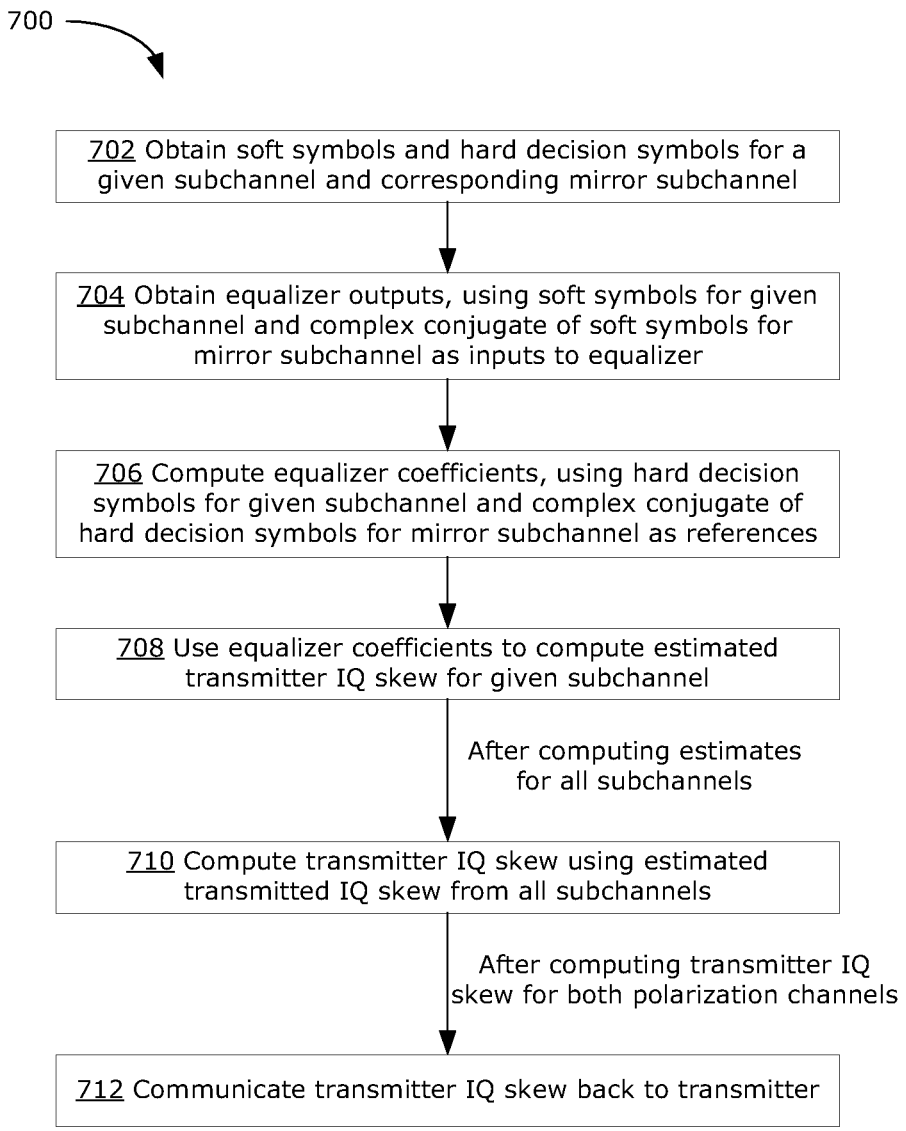
FIG. 7 is a flowchart illustrating an example method for estimating transmitter IQ skew using joint equalization, using a 2×2 complex-valued multi-tap MIMO equalizer, in accordance with an example of the present disclosure.

FIG. 7 is a flowchart illustrating a first example method 700 for estimating transmitter IQ skew using joint equalization, in the case where the MIMO equalizer is a time-domain 2×2 complex-valued MIMO equalizer (e.g., implemented in the joint equalization block 384) having four multi-tap coefficients. The method 700 may be performed using the example receiver implementation illustrated in FIG. 5A or the example receiver implementation illustrated in FIG. 5B.

At 702, the soft symbols and hard decision symbols are obtained (e.g., from the soft values buffer 382 and from the channel phase recovery block 368, after synchronization 370) for the given subchannel (denoted as the $i^{th}$ subchannel) and the corresponding mirror subchannel (denoted as the $(N+1-i)^{th}$ subchannel, where there are N subchannels in total).

At 704, the soft symbols for the given subchannel (i.e., $\{a_i\}$) and the complex conjugate of the soft symbols for the mirror subchannel and (i.e., $\{a^*_{N+1-i}\}$) are provided as inputs to the equalizer (specifically a 2×2 complex-valued multi-tap MIMO equalizer) in the time domain, to obtain equalizer outputs.

Figure 8:
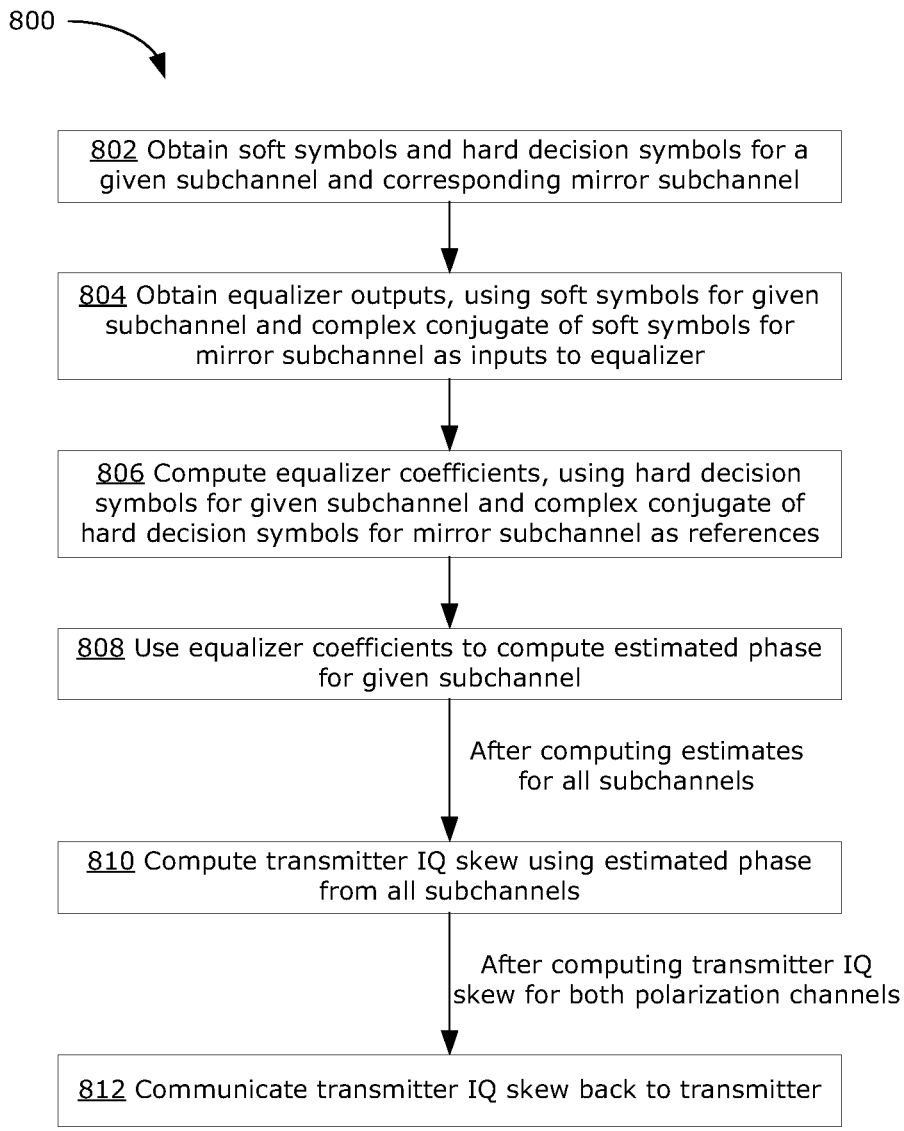
FIG. 8 is a flowchart illustrating an example method for estimating transmitter IQ skew using joint equalization, using a 2×2 complex-valued single-tap MIMO equalizer, in accordance with an example of the present disclosure.

Mathematically, the time-domain equalization process can be represented by the following equation:

$$\begin{bmatrix} a'_i \\ a'^*_{N+1-i} \end{bmatrix} = \begin{bmatrix} w_{11} & w_{12} \\ w_{21} & w_{22} \end{bmatrix} * \begin{bmatrix} a_i \\ a^*_{N+1-i} \end{bmatrix}$$

where * denotes the convolution operation in time domain, and $w_{mn}$ are the four multi-tap coefficients, denoting the time-domain filter between the $m^{th}$ output and the nth input, where m, n={1, 2}. The equalizer outputs are denoted as $\{a'_i\}$ and $\{a'_{N+1-i}{}^*\}$. The length of the filter (i.e., number of taps) may be a selectable parameter (e.g., selected according to user preference). In the special case that the number of taps is one (i.e., the MIMO equalizer is a 2×2 complex-valued single-tap MIMO equalizer, i.e., $w_{mn}$ consists of a single complex value), the method 800 illustrated in FIG. 8 is performed instead of the method 700 of FIG. 7.

Optionally, if the joint equalization block 384 is implemented in the DSP ASIC (e.g., as illustrated in FIG. 5A), the equalizer outputs may be inputted to the FEC decoder 372, to assist in decoding and helping to enhance system performance.

At 706, the equalizer coefficients are computed, using the hard decision symbols for the given subchannel (i.e., $\{d_{a,i}\}$) and the complex conjugate of the hard decision symbols for the mirror subchannel (i.e., $\{d^*_{N+1-i}\}$) as references. The equalizer coefficients are computed by minimizing the error between the equalizer outputs (i.e., $\{a'_i\}$ and $\{a'_{N+1-i}{}^*\}$) and the references (i.e., $\{d_{a,i}\}$ and $\{d^*_{N+1-i}\}$).

Various techniques may be used to compute the equalizer coefficients, including minimization techniques such as LMS or LS, among other possibilities. For example, the computation of the equalizer coefficients may be performed using the following equation:

$$\{w_{11}, w_{12}, w_{21}, w_{22}\}_{opt} = \min_{w_{mn}}\{\|a'_i - d_{a,i}\|^2 + \|a'^*_{N+1-i} - d^*_{N+1-i}\|^2\}$$

where $\{w_{11}, w_{12}, w_{21}, w_{22}\}$ are the four coefficients of the time domain equalizer, and where opt denotes the result of the minimization.

At 708, the equalizer coefficients are used to compute an estimated transmitter IQ skew as the estimated value for the given subchannel. As will be discussed further below, the transmitter IQ skew is estimated for each subchannel and the estimates from all subchannels are then used to compute the overall transmitter IQ skew (which is then communicated back to the transmitter).

Each equalizer coefficient is converted from the time domain to the frequency domain. For example, the n-point fast Fourier transform (FFT) of each equalizer coefficient is computed, where the FFT of the coefficient $W_{mn}$ is denoted using uppercase $W_{mn}$ (i.e., $W_{mn}$=FFT$\{w_{mn}\}$). For example, 128-point FFT may be used (i.e., n=128), however this is not intended to be limiting. If n is larger than the number of FIR taps in the coefficient, zero padding may be used.

Using the four converted equalizer coefficients (i.e., $\{w_{11}, w_{12}, w_{21}, w_{22}\}$), a n-point complex-valued quantity, denoted C, is constructed according to the following definition:

$$C(f) = \frac{W_{11} - W_{12}}{W_{11} + W_{12}}$$

where the constructed quantity C(f) is a function of frequency (n points). C(f) is an empirical construct based on the converted equalizer coefficients that, when the phase is plotted against frequency, contains transmitter IQ skew information. It may be noted that the equation for C(f) is not necessarily unique, and other equations may be found empirically. It should be understood that one skilled in the art would be able to, through routine trial-and-error, arrive at other empirical equations for defining C(f) such that C(f) is computed using some combination of the converted equalizer coefficients and such that the phase of C(f) plotted against frequency can be used to extract the transmitter IQ skew information.

The n-point phase response of the given subchannel is then extracted from the constructed quantity C(f) as follows:

$$\varphi_i(f) = \measuredangle C(f)$$

where $\varphi_i(f)$ denotes the phase response, extracted from the constructed quantity C(f), for the $i^{th}$ subchannel (i.e., the given subchannel), as a function of the frequency f. When the phase of C(f) is plotted against frequency, the slope of the phase can be used to compute the transmitter IQ skew.

The transmitter IQ skew for the $i^{th}$ subchannel (i.e., the given subchannel) can then be estimated using the following equation:

$$\hat{\tau}_{a,i} = \frac{1}{2\pi} \frac{d}{df} \varphi_i(f)$$

where $\hat{\tau}_{a,i}$ denotes the estimated transmitter IQ skew for the $i^{th}$ subchannel (i.e., the given subchannel), for one polarization channel (i.e., the subscript a denotes the X or Y polarization channel).

Although the above equation indicates that the estimated transmitter IQ skew is computed using the derivative (with respect to frequency) of the phase, in practice the slope of a linear fit of the phase response over a defined frequency range may be used instead of computing the derivative. For example, a linear fit may be performed to find the slope over a frequency range that is defined to be about 80% of the subchannel width (i.e., over the frequency range [−r*subBaud/2:r*subBaud/2], where r=0.8) to avoid fluctuations on the edges of the subchannel.

In this way, the estimated transmitter IQ skew is computed for all subchannels (i.e., for all values of i from 1 to N). The result is a set of estimated transmitter IQ skews for all subchannels, denoted $\{\hat{\tau}_{a,i}\}$ for i={1, . . . , N} (where the subscript a denotes the X or Y polarization channel).

After the estimated transmitter IQ skews for all subchannels are computed, the method 700 proceeds to step 710.

At 710, an overall transmitter IQ skew is computed using the estimates from all subchannels. The overall transmitter IQ skew may be computed using the following equation:

$$\hat{\tau}_a = \frac{1}{N} \sum_{i=1}^{N} \hat{\tau}_{a,i}$$

where $\hat{\tau}_a$ denotes the overall transmitter IQ skew that is computed for one polarization channel (as denoted by the subscript a, where a is either X or Y).

The transmitter IQ skew for both polarization channels are similarly computed. As previously mentioned, the transmitter IQ skew for both polarization channels may be computed in parallel or in sequence.

After the transmitter IQ skew has been computed for both polarization channels, the method 700 proceeds to step 712.

At 712, the transmitter IQ skew is communicated back to the transmitter. For example, the computed transmitter IQ skew for the X- and Y-polarizations may be provided to the transmitter IQ skew monitoring block 386, which communicates the transmitter IQ skew as feedback to the transmitter.

Using the method 700, the transmitter IQ skew may be computed using a time domain multi-tap 2×2 MIMO equalizer. A MIMO equalizer having three FIR taps for each coefficient has been found, in experiments, to be sufficient to compute the transmitter IQ skew with acceptable accuracy (e.g., with sufficiently small standard deviation and unbiased estimation).

FIG. 8 is a flowchart illustrating a second example method 800 for estimating transmitter IQ skew using joint equalization, in the case where the MIMO equalizer is a time-domain 2×2 complex-valued MIMO equalizer (e.g., implemented in the joint equalization block 384) having four single-tap coefficients (rather than multi-tap coefficients as in the method 700). The method 800 may be performed using the example receiver implementation illustrated in FIG. 5A or the example receiver implementation illustrated in FIG. 5B.

Steps 802 to 806 are similar to steps 702 to 706 described above, with the difference that single-tap filters are used instead of multi-tap filters. Thus, the equalizer coefficients $\{w_{11}, w_{12}, w_{21}, w_{22}\}$ are each a single complex-valued constant in the time domain and have no frequency dependency.

At 808, the equalizer coefficients are used to compute an estimated phase as the estimated value for the given subchannel. As will be discussed further below, a single phase value is estimated for each of the N subchannels and the phase estimates from all subchannels, in total N values, are then used to compute the overall transmitter IQ skew (which is then communicated back to the transmitter).

It may be noted that because each equalizer coefficient is a single constant value in the time domain, there is no additional information in the frequency domain (i.e., no frequency dependency). Accordingly, unlike in the method 700, it is not necessary to convert the equalizer coefficients from the time domain to the frequency domain.

The four single-tap equalizer coefficients (i.e., $\{w_{11}, w_{12}, w_{21}, w_{22}\}$, without performing FFT) are used to construct a single complex-valued constant denoted c, according to the following definition:

$$c = \frac{w_{11} - w_{12}}{w_{11} + w_{12}}$$

where the constructed quantity c is not a function of frequency since it is a single value. It may be noted that the constructed quantity c is an empirical construct based on the time domain equalizer coefficients. The constructed quantity c is similar to the previously discussed quantity C(f) in that the phase of c, when plotted against frequency, provides information about the transmitter IQ skew. The constructed quantity c is not necessarily unique, and other equations may be found empirically. It should be understood that one skilled in the art would be able to, through routine trial-and-error, arrive at other empirical equations for defining c such that c is computed using some combination of the time domain equalizer coefficients and such that the phase of c plotted against frequency can be used to extract the transmitter IQ skew information.

The phase estimate for the given subchannel is then extracted from the constructed single complex-valued constant c as follows:

$$\varphi_i \triangleq c$$

where $\varphi_i$ denotes the phase estimate, extracted from the constructed quantity c, for the $i^{th}$ subchannel (i.e., the given subchannel).

In this way, the estimated phase is computed for all subchannels (i.e., for all values of i from 1 to N). The result is a set of N estimated phases for all subchannels, denoted $\varphi_i$ for i={1, ..., N}.

At 810, the transmitter IQ skew is computed using the N estimated phases from all subchannels. The transmitter IQ skew may be computed using the following equation:

$$\hat{\tau}_a = \frac{1}{2\pi} \frac{d}{df} \varphi_i$$

where $\hat{\tau}_a$ denotes the estimated transmitter IQ skew, and the polarization channel is denoted by the subscript a (i.e., a={X, Y}). The term $$\frac{d}{df} \varphi_i$$

may be computed as the slope of the linear fit of the N points $\varphi_i, \ldots, \varphi_N$, plotted against the N center frequencies of each respective subchannel.

Transmitter IQ skew for both polarization channels are similarly computed. As previously mentioned, the transmitter IQ skew for both polarization channels may be computed in parallel or in sequence.

After the transmitter IQ skew has been computed for both polarization channels, the method 800 proceeds to step 812 to communicate the transmitter IQ skew back to the transmitter. For example, the computed transmitter IQ skew for the X- and Y-polarizations may be provided to the transmitter IQ skew monitoring block 386, which communicates the transmitter IQ skew as feedback to the transmitter.

Compared to the method 700, the method 800 may be implemented using single tap equalizer coefficients, which may be lower in complexity to implement. Experiments have found that the method 800, using a time domain single-tap 2×2 MIMO equalizer, is able to compute the transmitter IQ skew with acceptable accuracy (e.g., with sufficiently small standard deviation and unbiased estimation).

Figure 9:
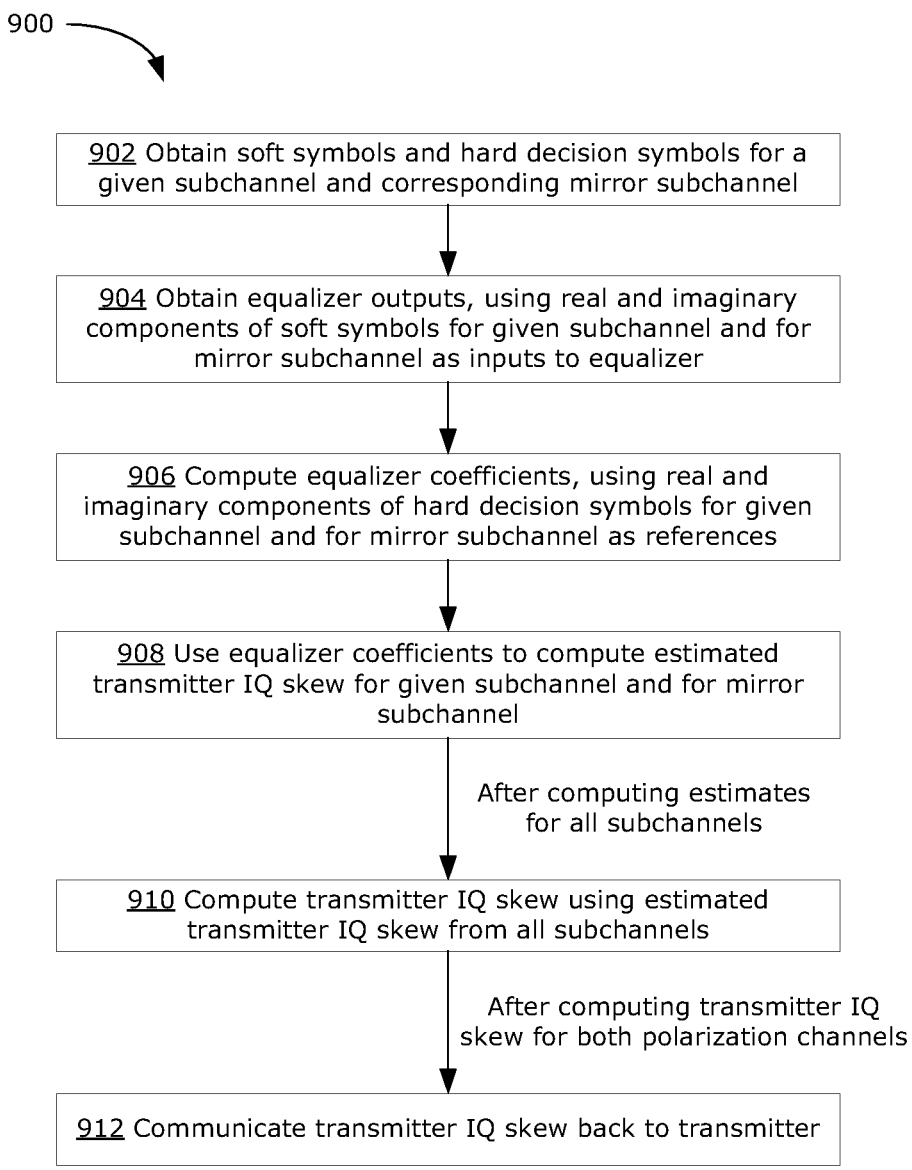
FIG. 9 is a flowchart illustrating an example method for estimating transmitter IQ skew using joint equalization, using a 4×4 real-valued multi-tap MIMO equalizer, in accordance with an example of the present disclosure.

FIG. 9 is a flowchart illustrating a third example method 900 for estimating transmitter IQ skew using joint equalization, in the case where the MIMO equalizer is a time-domain 4×4 real-valued MIMO equalizer (e.g., implemented in the joint equalization block 384) having 16 multi-tap coefficients (rather than a 2×2 complex-valued MIMO equalizer as in the method 700 and the method 800). The method 900 may be performed using the example receiver implementation illustrated in FIG. 5A or the example receiver implementation illustrated in FIG. 5B.

At 902, the soft symbols and hard decision symbols are obtained (e.g., from the soft values buffer 382 and from the channel phase recovery block 368, after synchronization 370) for the given subchannel (denoted as the $i^{th}$ subchannel) and the corresponding mirror subchannel (denoted as the $(N+1-i)^{th}$ subchannel, where there are N subchannels in total).

At 904, the real and imaginary components of the soft symbols for the given subchannel (i.e., {Re $a_i$} and {Im $a_i$}) and the real and imaginary components of the soft symbols for the mirror subchannel and (i.e., {Re $a_{N+1-i}$} and {Im $a_{N+1-i}$}) are provided as inputs to the 4×4 real-valued MIMO equalizer (specifically a 4×4 real-valued multi-tap MIMO equalizer) in the time domain, to obtain equalizer outputs.

Figure 10:
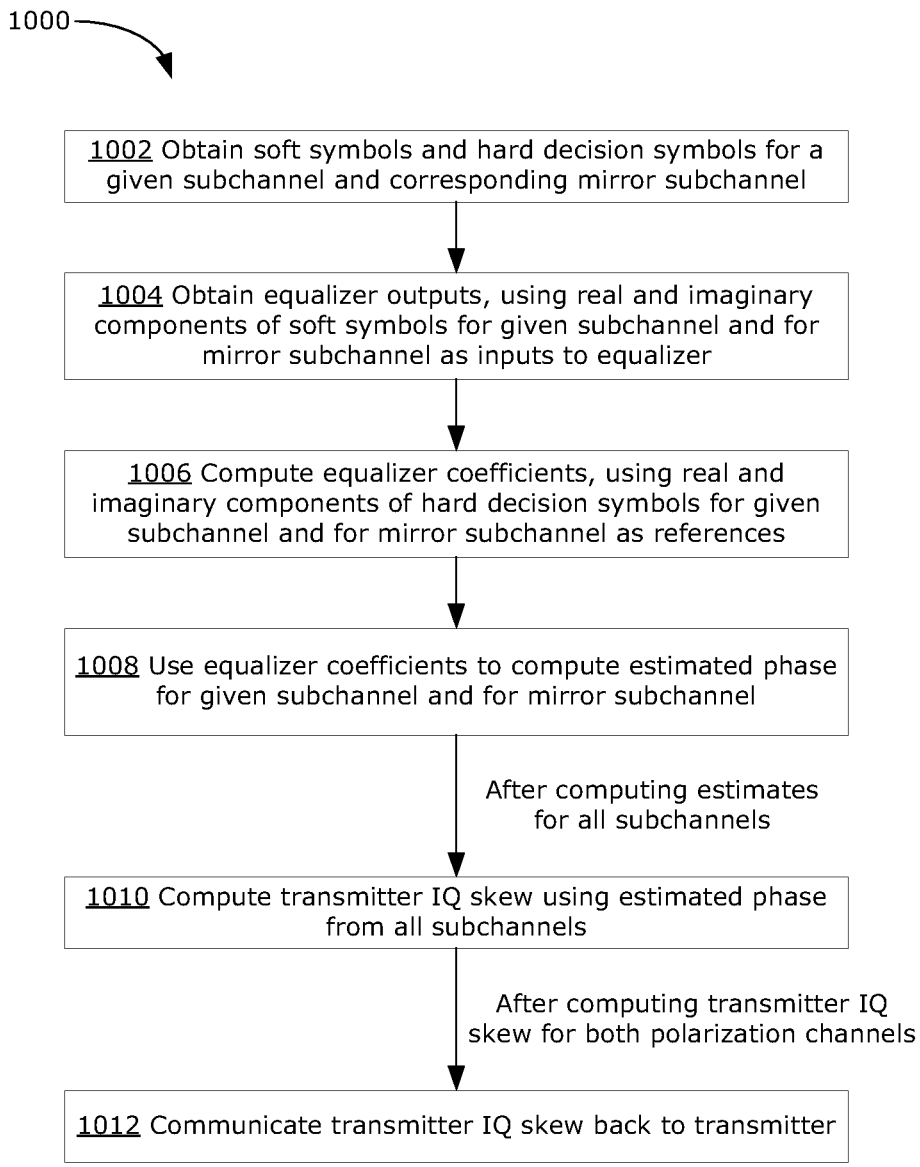
FIG. 10 is a flowchart illustrating an example method for estimating transmitter IQ skew using joint equalization, using a 4×4 real-valued single-tap MIMO equalizer, in accordance with an example of the present disclosure.

Mathematically, the time-domain equalization process can be represented by the following equation:

$$\begin{bmatrix} \text{Re } a'_i \\ \text{Im } a'_i \\ \text{Re } a'_{N+1-i} \\ \text{Im } a'_{N+1-i} \end{bmatrix} = \begin{bmatrix} w_{11} & w_{12} & w_{13} & w_{14} \\ w_{21} & w_{22} & w_{23} & w_{24} \\ w_{31} & w_{32} & w_{33} & w_{34} \\ w_{41} & w_{42} & w_{43} & w_{44} \end{bmatrix} * \begin{bmatrix} \text{Re } a_i \\ \text{Im } a_i \\ \text{Re } a_{N+1-i} \\ \text{Im } a_{N+1-i} \end{bmatrix}$$

where * denotes the convolution operation in time domain; $w_{kj}$ is the time-domain filter between the $k^{th}$ output and the $j^{th}$ input, where k,j={1, ..., 4}. The equalizer outputs are denoted as {Re $a'_i$}, {Im $a'_i$}, {Re $a'_{N-i}$} and {Im $a'_{N-i}$}. The number of taps to use for the multi-tap filters may be a selectable parameter (e.g., selected according to user preference). For example, three FIR taps may be used. In the special case that the number of taps is one (i.e., the MIMO equalizer is a 4×4 real-valued single-tap MIMO equalizer), the method 1000 illustrated in FIG. 10 is performed instead of the method 900 of FIG. 9.

Optionally, if the joint equalization block 384 is implemented in the DSP ASIC (e.g., as illustrated in FIG. 5A), the equalizer outputs may be inputted to the FEC decoder 372, to assist in decoding and helping to enhance system performance.

At 906, the equalizer coefficients are computed, using the real and imaginary components of the hard decision symbols for the given subchannel (i.e., {Re $d_{a,i}$} and {Im $d_{a,i}$}) and the real and imaginary components of the hard decision symbols for the mirror subchannel (i.e., {Re $d_{a,N+1-i}$} and {Im $d_{a,N+1-i}$}) as references (where the subscript a denote either the X- or Y-polarization). The equalizer coefficients are computed by minimizing the error between the equalizer outputs.

As discussed above, the equalizer coefficients may be computed using any suitable minimization techniques such as LMS or LS, among other possibilities. For example, the computation of the equalizer coefficients may be performed using the following equation:

$$\{w_{kj}\}_{opt} = \min_{w_{kj}} \{\|\text{Re } a'_i - \text{Re } d_{a,i}\|^2 + \|\text{Im } a'_i - \text{Im } d_{a,i}\|^2 +$$
$$\|\text{Re } a'_{N+1-i} - \text{Re } d_{a,N+1-i}\|^2 + \|\text{Im } a'_{N+1-i} - \text{Im } d_{a,N+1-i}\|^2\}$$

where {$w_{kj}$} denotes the 16 coefficients of the 4×4 real-valued MIMO equalizer, and where opt denotes the result of the minimization.

At 908, the equalizer coefficients are used to compute an estimated transmitter IQ skew as the estimated value for the given subchannel (i.e., the $i^{th}$ subchannel) as well as for the mirror subchannel (i.e., the $(N+1-i)^{th}$ subchannel). Notably, for a real-valued time series in the time domain, the corresponding value in the frequency domain is paired (in positive and negative frequency components). This enables the computation of the estimated transmitter IQ skew for the mirror subchannel, as well as for the given subchannel.

Each equalizer coefficient is converted from the time domain to the frequency domain. For example, the n-point FFT of each equalizer coefficient is computed, where the FFT of the coefficient $w_{kj}$ is denoted using uppercase $W_{kj}$ (i.e., $W_{kj}=FFT\{w_{kj}\}$). For example, 128-point FFT may be used (i.e., n=128), however this is not intended to be limiting. If n is larger than the number of FIR taps in the coefficient, zero padding may be used.

Using the 16 converted equalizer coefficients, a first n-point complex-valued quantity, denoted C, is constructed according to the following definition:

$$C(f) = \frac{W_{11} - W_{13} + W_{22} + W_{24} + j(W_{21} - W_{23} - W_{12} - W_{14})}{W_{11} + W_{13} + W_{22} - W_{24}}$$

A second n-point complex-valued quantity, denoted D, is constructed according to the following definition:

$$D(f) = \frac{W_{33} - W_{31} + W_{44} + W_{42} + j(W_{43} - W_{41} - W_{34} - W_{32})}{W_{31} + W_{33} - W_{42} + W_{44}}$$

Both the first constructed quantity C(f) and the second constructed quantity D(f) are functions of frequency (n points). The first constructed quantity C(f) is used to estimate the transmitter IQ skew for the given subchannel, and the second constructed quantity D(f) is used to estimate the transmitter IQ skew for the mirror subchannel. Both C(f) and D(f) are empirical constructs based on the converted equalizer coefficients, corresponding to the given subchannel and corresponding mirror subchannel. C(f) and D(f) are defined such that when the n-point phase of each is plotted against frequency, transmitter IQ skew can be computed from the slope. It may be noted that the equations for C(f) and D(f) are not necessarily unique, and other equations may be found empirically. It should be understood that one skilled in the art would be able to, through routine trial-and-error, arrive at other empirical equations for defining C(f) and D(f) such that C(f) and D(f) are computed using some combination of the converted equalizer coefficients and such that the n-point phase of C(f) and D(f) plotted against frequency can be used to extract the transmitter IQ skew information for a pair of mirror subchannels.

The n-point phase response of the given subchannel and the n-point phase response of the mirror subchannel are extracted from the first constructed quantity C(f) and the second constructed quantity D(f) as follows:

$\varphi_i(f) = \angle C(f)$ $\varphi_{N+1-i}(f) = \angle D(f)$ where $\varphi_i(f)$ denotes the phase response, extracted from the first constructed quantity C(f), for the $i^{th}$ subchannel (i.e., the given subchannel), and where $\varphi_{N+1-i}(f)$ denotes the phase response, extracted from the second constructed quantity D(f), for the $(N+1-i)^{th}$ subchannel (i.e., the corresponding mirror subchannel), both as functions of the frequency f.

The transmitter IQ skew for the given subchannel and the corresponding mirror subchannel can then be estimated using the following equations:

$$\hat{\tau}_{a,i} = \frac{1}{2\pi}\frac{d}{df}\varphi_i(f)$$

$$\hat{\tau}_{a,N+1-i} = \frac{1}{2\pi}\frac{d}{df}\varphi_{N+1-i}(f)$$

where $\hat{\tau}_{a,i}$ denotes the estimated transmitter IQ skew for the $i^{th}$ subchannel (i.e., the given subchannel) and where $\hat{\tau}_{a,i}$ denotes the estimated transmitter IQ skew for the $(N+1-i)^{th}$ subchannel (i.e., the mirror subchannel), for one polarization channel (i.e., the subscript a denotes the X or Y polarization channel).

Similar to the method 700, the slope of a linear fit of the phase response over a defined frequency range may be used instead of computing the derivative. For example, a linear fit may be performed to find the slope over a frequency range that is defined to be about 80% of the subchannel width (i.e., over the frequency range [−r*subBaud/2: r*subBaud/2], where r=0.8) to avoid fluctuations on the edges of the subchannel.

It may be noted that the above computations may be performed for only half of the subchannels (i.e., for values of i from 1 to N/2), in order to obtain estimated transmitter IQ skew for all subchannels. Notably, unlike the method 700 and the method 800, the equalizer coefficients do not need to be computed N times, rather only N/2 computations are required. This is because, as demonstrated in the above equations, the estimated transmitter IQ skew can be computed for both the given subchannel and the corresponding mirror subchannel using one set of computed equalizer coefficients.

Thus, by performing the above computations for the subchannels from 1 to N/2, the result is a set of estimated transmitter IQ skews for all subchannels, denoted $\{\hat{\tau}_{a,i}\}$ for $i=\{1, \ldots, N\}$ (where the subscript a denotes the X or Y polarization channel).

After the estimated transmitter IQ skews for all subchannels are computed, the method 900 proceeds to step 910 to compute the overall transmitter IQ skew using the estimates from all subchannels. The overall transmitter IQ skew may be computed using the following equation:

$$\hat{\tau}_a = \frac{1}{N}\sum_{i=1}^{N}\hat{\tau}_{a,i}$$

where $\hat{\tau}_a$ denotes the overall transmitter IQ skew that is computed for one polarization channel (as denoted by the subscript a, where a is either X or Y).

The transmitter IQ skew for both polarization channels are similarly computed. As previously mentioned, the transmitter IQ skew for both polarization channels may be computed in parallel or in sequence.

After the transmitter IQ skew has been computed for both polarization channels, the method 900 proceeds to step 912 to communicate the transmitter IQ skew back to the transmitter. For example, the computed transmitter IQ skew for the X- and Y-polarizations may be provided to the transmitter IQ skew monitoring block 386, which communicates the transmitter IQ skew as feedback to the transmitter.

Using the method 900, the transmitter IQ skew may be computed using a time domain multi-tap 4×4 real-valued MIMO equalizer. A MIMO equalizer having three FIR taps for each coefficient has been found, in experiments, to be sufficient to compute the transmitter IQ skew with acceptable accuracy (e.g., with sufficiently small standard deviation and unbiased estimation). Compared to the method 700 and the method 800, fewer iterations may be required (i.e., steps 902 to 908 are performed for only N/2 iterations, whereas steps 702 to 708 (in the method 700) and steps 802 to 808 (in the method 800) are performed for N iterations).

FIG. 10 is a flowchart illustrating a fourth example method 1000 for estimating transmitter IQ skew using joint equalization, in the case where the MIMO equalizer is a time-domain 4×4 real-valued MIMO equalizer (e.g., implemented in the joint equalization block 384) having 16 single-tap coefficients (rather than multi-tap coefficients as in the method 900). The method 1000 may be performed using the example receiver implementation illustrated in FIG. 5A or the example receiver implementation illustrated in FIG. 5B.

Steps 1002 to 1006 are similar to steps 902 to 906 described above, with the difference that single-tap filters are used instead of multi-tap filters. Thus, the 16 equalizer coefficients are each a single constant value in the time domain and have no frequency dependency.

At 1008, the equalizer coefficients are used to compute an estimated phase as the estimated value for the given subchannel, as well as an estimated phase for the mirror subchannel.

Since each of the 16 coefficients is a single real value in the time domain, without frequency dependency, it is not necessary to convert the equalizer coefficients from the time domain to the frequency domain.

The 16 equalizer coefficients (without performing FFT) are used to construct a first complex-valued constant, denoted c, and a second complex-valued constant, denoted d, using the following definitions:

$$c = \frac{w_{11} - w_{13} + w_{22} + w_{24} + j(w_{21} - w_{23} - w_{12} - w_{14})}{w_{11} + w_{13} + w_{22} - w_{24}}$$

$$d = \frac{w_{33} - w_{31} + w_{44} + w_{42} + j(w_{43} - w_{41} - w_{34} - w_{32})}{w_{31} + w_{33} - w_{42} + w_{44}}$$

The constructed quantities c and d are not functions of frequencies. It may be noted that the constructed quantities c and d are empirical constructs based on the time domain equalizer coefficients. The constructed quantities c and d are similar to the previously discussed quantities C(f) and D(f) in that the phases of c and d, when plotted against frequency, provide information about the transmitter IQ skew for a pair of mirror subchannels. The constructed quantities c and d are not necessarily unique, and other equations may be found empirically. It should be understood that one skilled in the art would be able to, through routine trial-and-error, arrive at other empirical equations for defining c and d such that c and d are computed using some combination of the time domain equalizer coefficients and such that the phase of c and d plotted against frequency can be used to extract the transmitter IQ skew information for a pair of mirror subchannels. The first constructed quantity c is used to estimate the phase value for the given subchannel (i.e., the $i^{th}$ subchannel) and the second constructed quantity d is used to estimate the phase value for the mirror subchannel (i.e., the $(N+1-i)^{th}$ subchannel), as follows:

$$\varphi_i = 2 \measuredangle c$$

$$\varphi_{N+1-i} = 2 \measuredangle d$$

Notably, compared to the computation of the estimated phase at step 808 of the method 800, the above equations include a multiplier of two.

It may be noted that the above computations may be performed for only half of the subchannels (i.e., for values of i from 1 to N/2), in order to obtain estimated transmitter IQ skew for all subchannels. Similarly to the method 900, it is sufficient to compute the equalizer coefficients for only N/2 iterations, because the estimated phase can be computed for both the given subchannel and the corresponding mirror subchannel using one set of computed equalizer coefficients.

Thus, by performing the above computations for the subchannels from 1 to N/2, the result is a set of N estimated phases for all subchannels, denoted $\varphi_i$ for i={1, . . . , N}.

At 1010, the transmitter IQ skew is computed using the estimated phase from all subchannels. The transmitter IQ skew may be computed using the following equation:

$$\hat{\tau}_a = \frac{1}{2\pi} \frac{d}{df} \varphi_i$$

where $\hat{\tau}_a$ denotes the estimated transmitter IQ skew, and the polarization channel is denoted by the subscript a (i.e., a={X, Y}). The term $$\frac{d}{df} \varphi_i$$

may be computed as the slope of the linear fit of the N points $\varphi_i, \ldots, \varphi_N$, plotted against the center frequencies of each respective subchannel.

The transmitter IQ skew for both polarization channels are similarly computed. As previously mentioned, the transmitter IQ skew for both polarization channels may be computed in parallel or in sequence.

After the transmitter IQ skew has been computed for both polarization channels, the method 1000 proceeds to step 1012 to communicate the transmitter IQ skew back to the transmitter. For example, the computed transmitter IQ skew for the X- and Y-polarizations may be provided to the transmitter IQ skew monitoring block 386, which communicates the transmitter IQ skew as feedback to the transmitter.

Similar to the method 900, the method 1000 may enable the transmitter IQ skew to be computed over N subchannels, using only N/2 iterations. Compared to the method 900, the method 1000 may be implemented using single tap equalizer coefficients, which may be lower in complexity to implement. (e.g., once every 5-10 minutes). This means that the joint equalization computation and transmitter IQ skew computation may be performed by a slower-rate processor outside of the DSP ASIC (e.g., as shown in FIG. 5B). In some examples, even though the transmitter IQ skew may be computed at a slower rate, it may be useful to perform the joint equalization computation in real-time (i.e., synchronized with each received symbol) within the DSP ASIC (e.g., as shown in FIG. 5A), to help improve the pre-decoding signal-to-noise ratio (SNR) of the symbols of each subchannel, to help enhance system performance.

Figure 11:
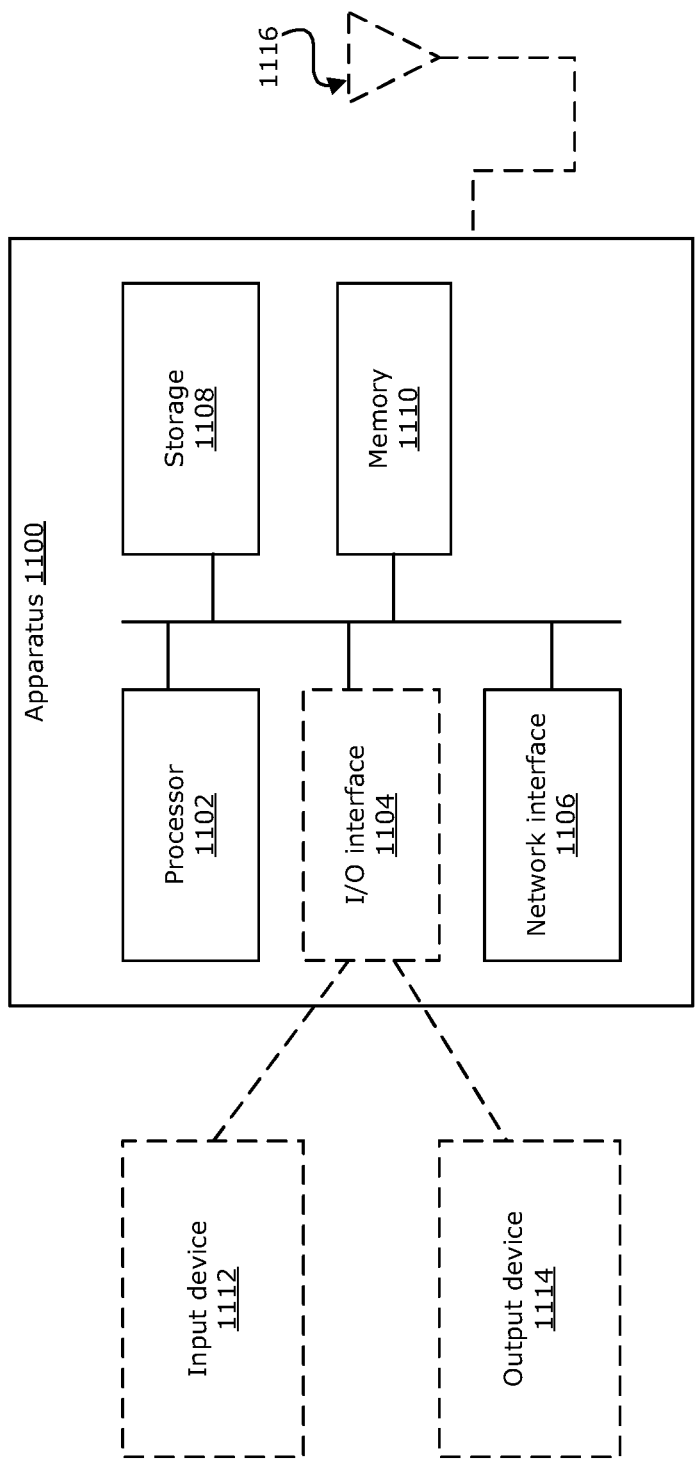
FIG. 11 is a block diagram illustrating an example apparatus that may be used to implemented examples of the present disclosure.

FIG. 11 is a block diagram illustrating an example apparatus 1100 in which examples described herein may be implemented. For example, the apparatus 1100 may be used to implement the receiver architecture shown in FIG. 5A or in FIG. 5B.

For example, the apparatus 1100 may be an electronic device, such as a server, a computing system, an access point (AP), a terminal device, etc. The apparatus 1100 is capable of optical communications, and may optionally also have capabilities for wireless communications. Other communication devices suitable for implementing examples described in the present disclosure may be used, which may include components different from those discussed below. Although FIG. 11 shows a single instance of each component, there may be multiple instances of each component in the apparatus 1100.

In this example, the apparatus 1100 includes at least one processor 1102, such as a microprocessor, an ASIC, a field-programmable gate array (FPGA), a dedicated logic circuitry, or combinations thereof. It should be noted that the apparatus 1100 also includes a DSP ASIC that is included in the receiver implemented in the network interface 1106. The apparatus 1100 may include an optional input/output (I/O) interface 1104, which may enable interfacing with an optional input device 1112 and/or optional output device 1114. The optional input device 1112 (e.g., a keyboard, a mouse, a microphone, a touchscreen, and/or a keypad) and optional output device 1114 (e.g., a display, a speaker and/or a printer) are shown as external to the apparatus 1100, and connected to optional I/O interface 1104. In other examples, the input device 1112 and/or the output device 1114 may be included as a component of the apparatus 1100.

The apparatus 1100 includes at least one network interface 1106, including an optical coherent receiver for receiving an optical signal. The network interface 1106 may additionally include a transmitter (not shown) for transmitting an optical signal. The receiver and transmitter may be implemented using an optical coherent transceiver implemented in the network interface 1106, in some examples.

Optionally, if the apparatus 1100 has capabilities for both optical communications and wireless communications, the apparatus 1100 may include one or more antennas 1116 to enable wireless communication. In this example, one antenna 1116 is shown, which may serve for both transmission and reception. However, in other examples there may be multiple antennas for transmitting and receiving. In examples where the apparatus 1100 does not have capability for wireless communications, the antenna(s) 1116 may be omitted.

The apparatus 1100 includes at least one storage unit 1108, which may include a mass storage unit such as a solid state drive, a hard disk drive, a magnetic disk drive and/or an optical disk drive. The apparatus 1100 also includes at least one memory 1110, which may include a volatile or non-volatile memory (e.g., a flash memory, a random access memory (RAM), and/or a read-only memory (ROM)). The non-transitory memory 1110 (as well as storage 1108) may store instructions for execution by the processor 1102. Additionally, the DSP ASIC of the optical receiver also may include a buffer or memory (not shown). For example, a buffer or memory of the DSP ASIC may be used to store computed equalizer coefficients and/or hard decisions and soft symbols (depending on implementation). Instructions for using the equalizer coefficients to compute the transmitter IQ skew may be executed by a processor external to the DSP ASIC. In some examples, instructions may also be provided by an external memory (e.g., an external drive in wired or wireless communication with the apparatus 1100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

In various examples, the present disclosure has described methods and apparatuses for monitoring transmitter IQ skew at a receiver of a DSCM system. In particular, examples of the present disclosure may use of a MIMO equalizer, implemented at the DCSM receiver, which accepts as input the signals from a pair of mirror subchannels (also referred to as mirror tones) of a DSCM signal. Examples have been described using a 2×2 complex-valued multi-tap MIMO equalizer, a 2×2 complex-valued single-tap MIMO equalizer, a 4×4 real-valued multi-tap MIMO equalizer, or a 4×4 real-valued single-tap MIMO equalizer. The disclosed examples have been found to be robust to optical polarization rotation and exhibit relatively high accuracy (e.g., unbiased estimation of transmitter IQ skew, with relatively low measurement standard deviation). Examples of the present disclosure may also be implemented using existing optical and electrical hardware, and with relatively low computational complexity.

The present disclosure describes examples that may be implemented in software or in low-rate microprocessors attached to the DSP ASIC of the receiver (e.g., as shown in FIG. 5B). Optionally, the calculated equalizer coefficients can be used to initialize the real-time equalizers on the DSP ASIC.

In some examples, the MIMO equalizer may be implemented in the DSP ASIC at the receiver, which may help to enhance the system performance (e.g., as in the example of FIG. 5A). It may be not be necessary to update the equalizer coefficients in real-time since the transmitter IQ skew drift is typically slow. For example, the equalizer coefficients may be calculated once during the monitoring stage, and the equalization may be subsequently performed as a static filtering operation to compensate for the transmitter IQ skew. Such an implementation may help to further reduce the computational complexity and to help enhance system performance.

The estimated transmitter IQ skew may then be communicated back to the transmitter via an optical path for skew correction.

Examples of the present disclosure may be used for transmitter IQ skew monitoring in point-to-point communication channels. For example, as a real-time equalization method on the ASIC-DSP, the examples described herein may be used to equalize the mirror images caused by transmitter impairment.

Examples of the present disclosure may be used for transmitter IQ skew monitoring in point-to-multipoint communication channels in optical access networks. For example, synchronized training sequences may be loaded into all subchannels, which are then sent from the transmitter. After transmission, the DSCM subchannels are frequency-demultiplexed into different users (or different access points). Examples disclosed herein may be implemented by a central node. Then each access point (each corresponding to a respective subchannel) may provide the subchannel DSP output (after carrier recovery) and the hard decision symbols to the central node.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processor device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. An apparatus comprising a receiver configured to:
receive four channels of a digital subcarrier multiplexed (DSCM) signal received from a transmitter, the four channels corresponding to in-phase (I) and quadrature (Q) channels for each of two orthogonal polarizations;
the apparatus further comprising a processor configured to:
compute a transmitter IQ skew for each of the two polarizations by:
jointly computing equalizer coefficients for all subchannels, wherein each subchannel is paired with a corresponding mirror subchannel, by:
obtaining soft symbols and hard decision symbols for the pairs of subchannel and corresponding mirror subchannel;
obtaining equalizer outputs from a joint multiple-input multiple-output (MIMO) equalizer, using the soft symbols of the pairs of subchannel and corresponding mirror subchannel as inputs to the MIMO equalizer; and
jointly computing equalizer coefficients, using the hard decision symbols of the pairs of subchannel and corresponding mirror subchannel as references, by minimizing error between the equalizer outputs and the references;
computing an estimated phase or an estimated transmitter IQ skew for each subchannel using the jointly computed equalizer coefficients, to obtain estimates for all subchannels of the DSCM signal; and
computing the transmitter IQ skew for each of the two polarizations using the estimates for all subchannels; and
communicate the computed transmitter IQ skew for the two polarizations to the transmitter.

2. The apparatus of claim 1, wherein the MIMO equalizer is a 4×4 real-valued multi-tap MIMO equalizer having sixteen multi-tap equalizer coefficients, and wherein the transmitter IQ skew is computed for each of the two polarizations by:
computing the multi-tap equalizer coefficients for a given subchannel by:
obtaining soft symbols and hard decision symbols for the given subchannel and a corresponding mirror subchannel;
obtaining multi-tap equalizer outputs from the MIMO equalizer, using real and imaginary components of the soft symbols of the given subchannel and real and imaginary components of the soft symbols of the mirror subchannel as inputs to the MIMO equalizer; and
computing the multi-tap equalizer coefficients, using real and imaginary components of the hard decision symbols of the given subchannel and real and imaginary components of the hard decision symbols of the mirror subchannel as references;
computing the estimated transmitter IQ skew for the given subchannel and for the mirror subchannel using the multi-tap equalizer coefficients computed for the given subchannel;
repeating the computation of the estimated transmitter IQ skew to obtain estimated transmitted IQ skews for all subchannels of the DSCM signal; and
computing the transmitter IQ skew using the estimated transmitter IQ skew for all subchannels.

3. The apparatus of claim 2, wherein computing the estimated transmitter IQ skew for the given subchannel and the mirror subchannel comprises:
converting the multi-tap equalizer coefficients from time domain to frequency domain;
extracting phase response for the given subchannel and for the mirror subchannel using the converted equalizer coefficients; and
estimating the transmitter IQ skew for the given subchannel using a slope of the phase response of the given subchannel, and estimating the transmitter IQ skew for the mirror subchannel using a slope of the phase response of the mirror subchannel.

4. The apparatus of claim 3, wherein extracting phase response for the given subchannel and for the mirror subchannel using the converted equalizer coefficients comprises:
extracting the phase response for the given subchannel using a first equation:

$$\varphi_i(f) = \angle C(f)$$

where $\varphi_i(f)$ denotes the phase response for the given subchannel, $f$ denotes frequency and where $C(f)$ is an empirical construct defined by the converted equalizer coefficients such that the slope of $\varphi_i(f)$, when plotted against frequency, is used to estimate the transmitter IQ skew for the given subchannel according to:

$$\hat{\tau}_i = \frac{1}{2\pi} \frac{d}{df} \varphi_i(f)$$

where $\hat{\tau}_i$ denotes the estimated transmitter IQ skew for the given subchannel, and $$\frac{d}{df}\varphi_i(f)$$

denotes the slope or the phase response for the given subchannel plotted against frequency; and extracting the phase response for the mirror subchannel using a second equation:

$$\varphi_{N+1-i}(f) = \angle D(f)$$

where $\varphi_{N+1-i}(f)$ denotes the phase response for the mirror subchannel, $f$ denotes frequency and where $D(f)$ is an empirical construct defined by the converted equalizer coefficients such that the slope of $\varphi_{N+1-i}(f)$, when plotted against frequency, is used to estimate the transmitter IQ skew for the mirror subchannel according to:

$$\hat{\tau}_{N+1-i} = \frac{1}{2\pi}\frac{d}{df}\varphi_{N+1-i}(f)$$

where $\hat{\tau}_{N+1-i}$ denotes the estimated transmitter IQ skew for the mirror subchannel, and $$\frac{d}{df}\varphi_{N+1-i}(f)$$

denotes the slope of the phase response for the mirror subchannel plotted against frequency.

5. The apparatus of claim 1, wherein the MIMO equalizer is a 2×2 complex-valued multi-tap MIMO equalizer having four multi-tap equalizer coefficients, and wherein the transmitter IQ skew is computed for each of the two polarizations by:
computing the multi-tap equalizer coefficients for a given subchannel by:
obtaining soft symbols and hard decision symbols for the given subchannel and the a corresponding mirror subchannel;
obtaining multi-tap equalizer outputs from the MIMO equalizer, using the soft symbols of the given subchannel and a complex conjugate of the soft symbols of the mirror subchannel as inputs to the MIMO equalizer; and
computing the multi-tap equalizer coefficients, using the hard decision symbols of the given subchannel and a complex conjugate of the hard decision symbols of the mirror subchannel as references; and
computing the estimated transmitter IQ skew for the given subchannel using the multi-tap equalizer coefficients computed for the given subchannel;
repeating the computation of the estimated transmitter IQ skew for all subchannels of the DSCM signal; and
computing the transmitter IQ skew using the estimated transmitter IQ skew for all subchannels.

6. The apparatus of claim 5, wherein computing the estimated transmitter IQ skew for the given subchannel comprises:
converting the multi-tap equalizer coefficients from time domain to frequency domain;
extracting phase response for the given subchannel using the converted equalizer coefficients; and
estimating the transmitter IQ skew for the given subchannel using a slope of the phase response.

7. The apparatus of claim 6, wherein extracting phase response for the given subchannel using the converted equalizer coefficients comprises:
extracting the phase response for the given subchannel using an equation:

$$\varphi_i(f) = \angle C(f)$$

where $\varphi_i(f)$ denotes the phase response for the given subchannel, $f$ denotes frequency and where $C(f)$ is an empirical construct defined by the converted equalizer coefficients such that the slope of $\varphi_i(f)$, when plotted against frequency, is used to estimate the transmitter IQ skew for the given subchannel according to:

$$\hat{\tau}_i = \frac{1}{2\pi}\frac{d}{df}\varphi_i(f)$$

where $\hat{\tau}_i$ denotes the estimated transmitter IQ skew for the given subchannel, and $$\frac{d}{df}\varphi_i(f)$$

denotes the slope of the phase response for the given subchannel plotted against frequency.

8. The apparatus of claim 1 wherein the MIMO equalizer is a 4×4 real-valued single-tap MIMO equalizer having sixteen single-tap equalizer coefficients, and wherein the transmitter IQ skew is computed for each of the two polarizations by:
computing the single-tap equalizer coefficients for a given subchannel by:
obtaining soft symbols and hard decision symbols for the given subchannel and a corresponding mirror subchannel;
obtaining single-tap equalizer outputs from the MIMO equalizer, using real and imaginary components the soft symbols of the given subchannel and real and imaginary components of the soft symbols of the mirror subchannel as inputs to the MIMO equalizer; and
computing the single-tap equalizer coefficients, using real and imaginary components of the hard decision symbols of the given subchannel and real and imaginary components of the hard decision symbols of the mirror subchannel as references;
computing the estimated phase for the given subchannel and for the mirror subchannel using the single-tap equalizer coefficients computed for the given subchannel;
repeating the computation of the estimated phase to obtain estimated phases for all subchannels of the DSCM signal; and
computing the transmitter IQ skew using the estimated phases for all subchannels.

9. The apparatus of claim 8, wherein the estimated phase for the given subchannel is computed using a first equation:

$$\varphi_i = 2\angle c$$

where $\varphi_i$ denotes the estimated phase for the given subchannel;
wherein the estimated phase for the mirror subchannel is computed using a second equation:

$$\varphi_{N+1-i} = 2\angle d$$

where $\varphi_{N+1-i}$ denotes the estimated phase for the mirror subchannel;

where c and d are empirical constructs each defined by the single-tap equalizer coefficients such that a slope of the estimated phases for all subchannels, plotted against center frequencies of the subchannels, is used to estimate the transmitter IQ skew according to:

$$\hat{\tau} = \frac{1}{2\pi} \frac{d}{df} \varphi_i$$

where $\hat{\tau}$ denotes the estimated transmitter IQ skew, and $$\frac{d}{df} \varphi_i$$

denotes the slope of the estimated phases for all subchannels plotted against the center frequencies of the subchannels.

10. The apparatus of claim 1, wherein the MIMO equalizer is a 2×2 complex-valued single-tap MIMO equalizer having four single-tap equalizer coefficients, and wherein the transmitter IQ skew is computed for each of the two polarizations by:
    computing the single-tap equalizer coefficients for a given subchannel by:
        obtaining soft symbols and hard decision symbols for the given subchannel and the a corresponding mirror subchannel;
        obtaining single-tap equalizer outputs from the MIMO equalizer, using the soft symbols of the given subchannel and a complex conjugate of the soft symbols of the mirror subchannel as inputs to the MIMO equalizer; and
        computing the single-tap equalizer coefficients, using the hard decision symbols of the given subchannel and a complex conjugate of the hard decision symbols of the mirror subchannel as references;
    computing the estimated phase for the given subchannel using the single-tap equalizer coefficients computed for the given subchannel;
    repeating the computation of the estimated phases for all subchannels of the DSCM signal; and
    computing the transmitter IQ skew using the estimated phases for all subchannels.

11. The apparatus of claim 10, wherein the estimated phase for the given subchannel is computed using an equation:

$$\varphi_i = 2 \measuredangle c$$

where $\varphi_i$ denotes the estimated phase for the given subchannel;

where c is an empirical construct defined by the single-tap equalizer coefficients such that a slope of the estimated phases for all subchannels, plotted against center frequencies of the subchannels, is used to estimate the transmitter IQ skew according to:

$$\hat{\tau} = \frac{1}{2\pi} \frac{d}{df} \varphi_i$$

where $\hat{\tau}$ denotes the estimated transmitter IQ skew, and $$\frac{d}{df} \varphi_i$$

denotes the slope of the estimated phases for all subchannels plotted against the center frequencies of the subchannels.

12. The apparatus of claim 1, wherein the processor is implemented in the receiver of the apparatus, and wherein the MIMO equalizer is implemented in the receiver.

13. The apparatus of claim 12, wherein the equalizer outputs are provided to a decoder of the receiver, to assist in decoding the hard decision symbols.

14. A method, comprising:
    receiving four channels of a digital subcarrier multiplexed (DSCM) signal received from a transmitter, the four channels corresponding to in-phase (I) and quadrature (Q) channels for each of two orthogonal polarizations;
    computing a transmitter IQ skew for each of the two polarizations by:
        jointly computing equalizer coefficients for all subchannels, wherein each subchannel is paired with a corresponding mirror subchannel, by:
            obtaining soft symbols and hard decision symbols for the pairs of subchannel and corresponding mirror subchannel;
            obtaining equalizer outputs from a joint multiple-input multiple-output (MIMO) equalizer, using the soft symbols of the pairs of subchannel and corresponding mirror subchannel as inputs to the MIMO equalizer; and
            jointly computing equalizer coefficients, using the hard decision symbols of the pairs of subchannel and the corresponding mirror subchannel as references, by minimizing error between the equalizer outputs and the references;
        computing an estimated phase or an estimated transmitter IQ skew for each subchannel using the jointly computed equalizer, to obtain estimates for all subchannels of the DSCM signal; and
        computing the transmitter IQ skew for each of the two polarizations using the estimates for all subchannels; and
    communicating the computed transmitter IQ skew for the two polarizations to the transmitter.

15. The method of claim 14, wherein the MIMO equalizer is a 4×4 real-valued multi-tap MIMO equalizer having sixteen multi-tap equalizer coefficients, and wherein the transmitter IQ skew is computed for each of the two polarizations by:
    computing the multi-tap equalizer coefficients for a given subchannel by:
        obtaining soft symbols and hard decision symbols for the given subchannel and a corresponding mirror subchannel;
        obtaining multi-tap equalizer outputs from the MIMO equalizer, using real and imaginary components the soft symbols of the given subchannel and real and imaginary components of the soft symbols of the mirror subchannel as inputs to the MIMO equalizer; and
        computing the multi-tap equalizer coefficients, using real and imaginary components of the hard decision symbols of the given subchannel and real and imaginary components of the hard decision symbols of the mirror subchannel as references;
    computing the estimated transmitter IQ skew for the given subchannel and for the mirror subchannel using the equalizer coefficients computed for the given subchannel;

repeating the computation of the estimated transmitter IQ skew to obtain estimated transmitted IQ skews for all subchannels of the DSCM signal; and computing the transmitter IQ skew using the estimated transmitter IQ skew for all subchannels.

16. The method of claim 15, wherein computing the estimated transmitter IQ skew for the given subchannel and the mirror subchannel comprises:

converting the multi-tap equalizer coefficients from time domain to frequency domain;

extracting phase response for the given subchannel and for the mirror subchannel using the converted equalizer coefficients; and estimating the transmitter IQ skew for the given subchannel using a slope of the phase response of the given subchannel, and estimating the transmitter IQ skew for the mirror subchannel using a slope of the phase response of the mirror subchannel.

17. The method of claim 14, wherein the MIMO equalizer is a 2×2 complex-valued multi-tap MIMO equalizer having four multi-tap equalizer coefficients, and wherein the transmitter IQ skew is computed for each of the two polarizations by:

computing the multi-tap equalizer coefficients for a given subchannel by:

obtaining soft symbols and hard decision symbols for the given subchannel and a corresponding mirror subchannel;

obtaining multi-tap equalizer outputs from the MIMO equalizer, using the soft symbols of the given subchannel and a complex conjugate of the soft symbols of the mirror subchannel as inputs to the MIMO equalizer; and computing the multi-tap equalizer coefficients, using the hard decision symbols of the given subchannel and a complex conjugate of the hard decision symbols of the mirror subchannel as references;

computing the estimated transmitter IQ skew for the given subchannel using the equalizer coefficients computed for the given subchannel;

repeating the computation of the estimated transmitter IQ skew for all subchannels of the DSCM signal; and computing the transmitter IQ skew using the estimated transmitter IQ skew for all subchannels.

18. The method of claim 17, wherein computing the estimated transmitter IQ skew for the given subchannel comprises:

converting the multi-tap equalizer coefficients from time domain to frequency domain;

extracting phase response for the given subchannel using the converted equalizer coefficients; and estimating the transmitter IQ skew for the given subchannel using a slope of the phase response.

19. The method of claim 14 wherein the MIMO equalizer is a 4×4 real-valued single-tap MIMO equalizer having sixteen single-tap equalizer coefficients, and wherein the transmitter IQ skew is computed for each of the two polarizations by:

computing the single-tap equalizer coefficients for a given subchannel by:

obtaining soft symbols and hard decision symbols for the given subchannel and a corresponding mirror subchannel;

obtaining single-tap equalizer outputs from the MIMO equalizer, using real and imaginary components the soft symbols of the given subchannel and real and imaginary components of the soft symbols of the mirror subchannel as inputs to the MIMO equalizer; and computing the single-tap equalizer coefficients, using real and imaginary components of the hard decision symbols of the given subchannel and real and imaginary components of the hard decision symbols of the mirror subchannel as references;

computing the estimated phase for the given subchannel and for the mirror subchannel using the equalizer coefficients computed for the given subchannel;

repeating the computation of the estimated phase to obtain estimated phases for all subchannels of the DSCM signal; and computing the transmitter IQ skew using the estimated phases for all subchannels.

20. The method of claim 14, wherein the MIMO equalizer is a 2×2 complex-valued single-tap MIMO equalizer having four single-tap equalizer coefficients, and wherein the transmitter IQ skew is computed for each of the two polarizations by:

computing the single-tap equalizer coefficients for a given subchannel by:

obtaining soft symbols and hard decision symbols for the given subchannel and a corresponding mirror subchannel;

obtaining single-tap equalizer outputs from the MIMO equalizer, using the soft symbols of the given subchannel and a complex conjugate of the soft symbols of the mirror subchannel as inputs to the MIMO equalizer; and computing the single-tap equalizer coefficients, using the hard decision symbols of the given subchannel and a complex conjugate of the hard decision symbols of the mirror subchannel as references;

computing the estimated phase for the given subchannel using the equalizer coefficients computed for the given subchannel;

repeating the computation of the estimated phases for all subchannels of the DSCM signal; and computing the transmitter IQ skew using the estimated phases for all subchannels.

* * * * *